United States Patent
Kang et al.

(10) Patent No.: US 10,268,309 B2
(45) Date of Patent: Apr. 23, 2019

(54) ELECTRONIC DEVICE AND OPERATING METHOD THEREOF

(71) Applicant: SAMSUNG ELECTRONICS CO., LTD., Suwon-si, Gyeonggi-do (KR)

(72) Inventors: Han-Vit Kang, Suwon-si (KR); Jung-Sik Park, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/397,069

(22) Filed: Jan. 3, 2017

(65) Prior Publication Data

US 2017/0192597 A1  Jul. 6, 2017

(30) Foreign Application Priority Data

Jan. 4, 2016 (KR) .......................... 10-2016-0000635

(51) Int. Cl.
| | |
|---|---|
| *G06F 3/0488* | (2013.01) |
| *G06F 3/041* | (2006.01) |
| *G06F 1/16* | (2006.01) |
| *G06F 3/044* | (2006.01) |

(52) U.S. Cl.
CPC .......... *G06F 3/0416* (2013.01); *G06F 1/1618* (2013.01); *G06F 3/044* (2013.01); *G06F 3/0488* (2013.01); *G06F 2203/04102* (2013.01); *G06F 2203/04104* (2013.01)

(58) Field of Classification Search
CPC ...... G06F 3/0416; G06F 1/1618; G06F 3/044; G06F 2203/04102; G06F 2203/04104; G06F 3/03545; G06F 3/0418; G06F 1/1637; G06F 3/0488
See application file for complete search history.

(56) References Cited

U.S. PATENT DOCUMENTS

| | | | |
|---|---|---|---|
| 2011/0084857 A1* | 4/2011 | Marino | .................. G06F 3/044 341/5 |
| 2011/0090155 A1 | 4/2011 | Caskey et al. | |
| 2013/0021267 A1* | 1/2013 | Lin | ...................... G06F 3/0416 345/173 |

(Continued)

FOREIGN PATENT DOCUMENTS

| | | |
|---|---|---|
| KR | 10-2015-0056769 | 5/2015 |
| KR | 10-2015-0066885 | 6/2015 |
| KR | 10-2015-0087758 | 7/2015 |

*Primary Examiner* — Richard J Hong

(74) *Attorney, Agent, or Firm* — Nixon & Vanderhye P.C.

(57) ABSTRACT

Disclosed are an electronic device and an operating method thereof. The electronic device includes a housing including a first area and a second area; a first device disposed in the first area; and a second device disposed in the second area, wherein the first device includes a first touch sensing circuit configured to use a first frequency in order to sense a touch, the second device includes a second touch sensing circuit configured to use a second frequency in order to sense a touch, and the first frequency at least temporarily differs from the second frequency while the electronic device operates. The method includes using a first frequency for sensing a touch corresponding to a first device; and using a second frequency for sensing a touch corresponding to a second device, wherein the first frequency at least temporarily differs from the second frequency while the electronic device operates.

13 Claims, 20 Drawing Sheets

(56) References Cited

U.S. PATENT DOCUMENTS

| | | | |
|---|---|---|---|
| 2014/0145998 A1* | 5/2014 | Liu | G06F 3/0418 345/174 |
| 2015/0054797 A1* | 2/2015 | Takahashi | G06F 3/03545 345/179 |
| 2015/0212621 A1* | 7/2015 | Pan | G06F 3/041 345/174 |
| 2015/0277660 A1 | 10/2015 | Yang et al. | |
| 2017/0046005 A1* | 2/2017 | Monson | G06F 3/0418 |
| 2017/0364118 A1* | 12/2017 | Matsumoto | G06F 1/1637 |

* cited by examiner

ELECTRONIC DEVICE AND OPERATING METHOD THEREOF

CROSS-REFERENCE TO RELATED APPLICATION

This application is based on and claims priority under 35 U.S.C. § 119 to Korean Application Serial No. 10-2016-0000635, which was filed in the Korean Intellectual Property Office on Jan. 4, 2016, the content of which is incorporated by reference herein in its entirety.

TECHNICAL FIELD

The present disclosure relates generally to an electronic device and an operating method thereof.

BACKGROUND

Electronic devices can execute various functions or programs, and portable electronic devices, such as, for example, smartphones or tablet computers, can provide users with greater convenience according to the implementation of advanced performance. An electronic device provides various user interfaces in order to exchange, with a user, information related to a function or a program that the electronic device can execute.

The electronic device provides the user with an interface capable of controlling the electronic device or inputting a command by using an input which is performed on a touch input apparatus. The user can enter an input by contacting the input apparatus by using an input tool, such as a stylus or a finger of the user.

In the case of an electronic device including multiple devices (e.g., touch input apparatuses), a malfunction (e.g., a ghost touch) may occur when input tools simultaneously approach or contact the respective multiple devices. For example, a ghost touch is likely to occur when a user is holding the respective multiple devices in both hands or is holding the multiple devices in the hand of the user in a state where the electronic device is folded and the multiple devices face each other. This is because, when the multiple devices operate at an identical frequency, a signal having a driving frequency characteristic is moved and delivered to the different device through the input tool and accordingly, frequency interference may occur. Alternatively, when the multiple devices operate at the identical frequency, electrical charges of the one device may move to the different device by way of the input tool, and accordingly, frequency interference may occur.

SUMMARY

Various example embodiments of the present disclosure provide an electronic device and an operating method thereof which can reduce the occurrence of a malfunction in multiple touch input apparatuses.

In accordance with an example aspect of the present disclosure, an electronic device is provided. The electronic device includes a housing including a first area and a second area; a first device disposed in the first area; and a second device disposed in the second area, wherein the first device comprises a first touch sensing circuit configured to use a first frequency to sense a touch, the second device comprises a second touch sensing circuit configured to use a second frequency to sense a touch, wherein the first frequency at least temporarily differs from the second frequency while the electronic device operates.

In accordance with another example aspect of the present disclosure, a method of operating an electronic device is provided. The method includes using a first frequency for sensing a touch, the first frequency corresponding to a first device; and using a second frequency for sensing a touch, the second frequency corresponding to a second device, wherein the first frequency at least temporarily differs from the second frequency while the electronic device operates.

BRIEF DESCRIPTION OF THE DRAWINGS

The above and other aspects, features, and attendant advantages of the present disclosure will be more readily apparent and understood from the following detailed description, taken in conjunction with the accompanying drawings, in which like reference numerals refer to like elements, and wherein.

DETAILED DESCRIPTION

Figure 1:
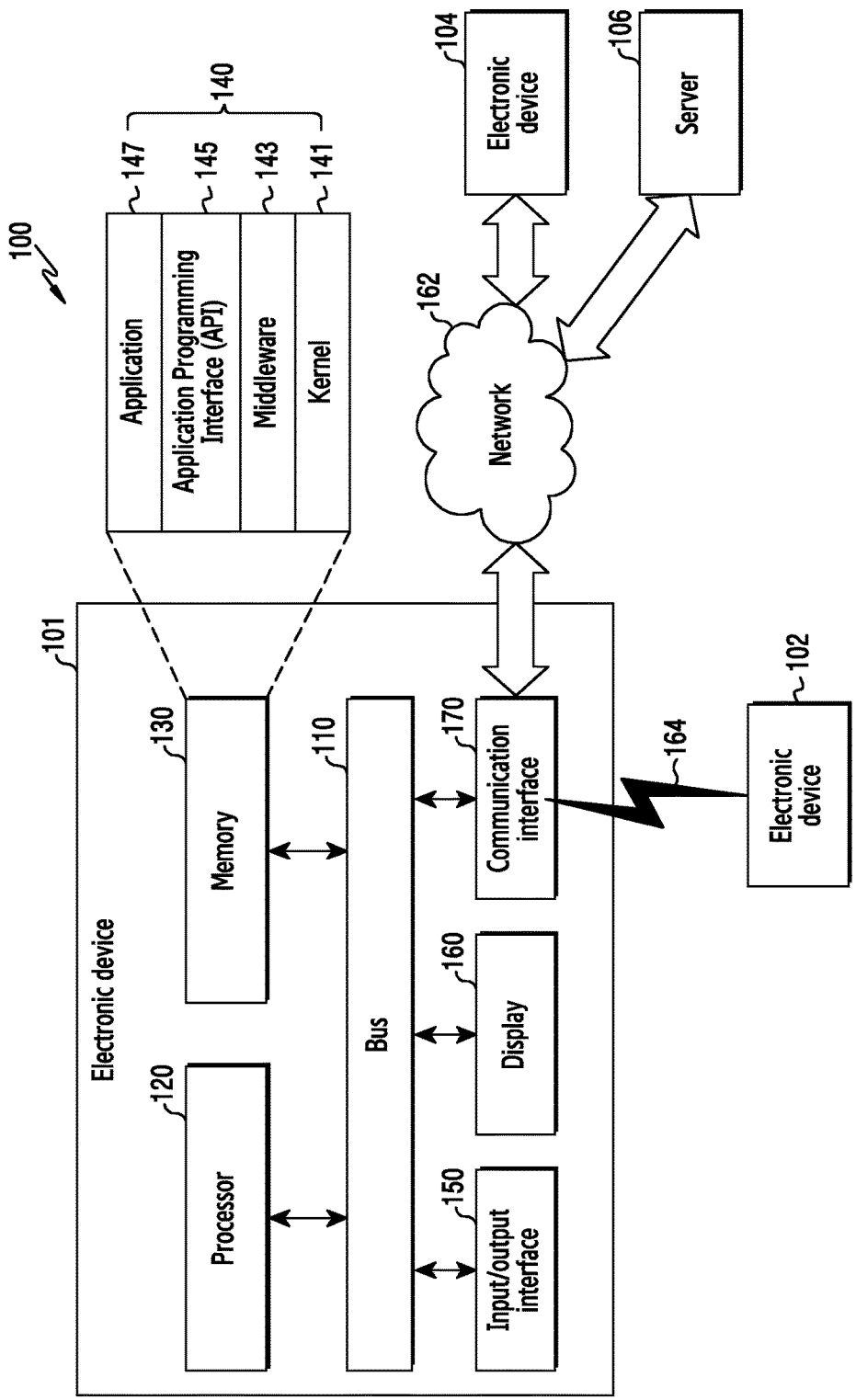
FIG. 1 is a block diagram illustrating an example system in a network environment according to various example embodiments of the present disclosure.

Various example embodiments of the present disclosure are described below with reference to the accompanying drawings. However, these various example embodiments are not intended to limit the technology mentioned in the present disclosure to a specific embodiment or form, and should be understood to include various modifications, equivalents and/or alternatives of the various example embodiments of the present disclosure. In relation to a description of the drawing, like reference symbols can denote like constituent elements.

In the present disclosure, the expressions "have", "can have", "comprise", "can comprise", etc. indicate the existence of a corresponding feature (e.g., a numeral value, a function, an operation, or a constituent element such as a component, etc.), and do not exclude the existence of an additional feature.

In the present disclosure, the expressions "A or B", "at least one of A or/and B", "one or more of A or/and B", etc.

can include all available combinations of items enumerated together. For example, "A or B", "at least one of A and B", or "at least one of A or B" can denote all of the cases of (1) including at least one A, (2) including at least one B, or (3) including all of at least one A and at least one B.

The expressions "1st", "2nd", "first", "second", etc. used in the present disclosure can modify various constituent elements irrespective of order and/or importance, and are just used to distinguish one constituent element from another constituent element and do not limit the corresponding constituent elements. For example, a first user device and a second user device can represent different user devices regardless of order or importance. For example, a first constituent element can be named a second constituent element without departing from the scope of right mentioned in the present disclosure and similarly, even the second constituent element can be interchangeably named the first constituent element.

When it is mentioned that any constituent element (e.g., a first constituent element) is "(operatively or communicatively) coupled with/to" or is "connected to" another constituent element (e.g., a second constituent element), it will have to be understood that the any constituent element can be directly coupled to the another constituent element, or be coupled to the another constituent element through a further constituent element (e.g., a third constituent element). On the other hand, when it is mentioned that any constituent element (e.g., a first constituent element) is "directly coupled" or is "directly connected" to another constituent element (e.g., a second constituent element), it can be understood that a further constituent element (e.g., a third constituent element) does not exist between the any constituent element and the another constituent element.

The expression "configured (or set) to~" used in the present disclosure can be used interchangeably with, for example, "suitable for~", "having the capacity to~", "designed to~", "adapted to~", "made to~", or "capable of~" in accordance with a situation. The term "configured (or set) to~" may not necessarily refer only to "specifically designed to" in hardware. Instead, in any situation, the expression "device configured to~" can represent that the device is "capable of ~" together with other devices or components. For example, the phrase "processor configured (or set) to perform A, B, and C" can represent a dedicated processor (e.g., embedded processor) for performing a corresponding operation, or a generic-purpose processor (e.g., a Central Processing Unit (CPU) or an Application Processor (AP)) capable of performing corresponding operations by executing one or more software programs stored in a memory device.

The terms used in the present disclosure are used to just describe various example embodiments, and does not have an intention to limit the scope of various other embodiments. For example, the expression of a singular form can include the expression of a plural form unless the disclosure or corresponding description clearly dictates otherwise. The terms used herein inclusive of technological or scientific terms can have the same meaning as those commonly understood by a person having ordinary knowledge in the art mentioned in the present disclosure. Among the terms used in the present disclosure, the terms defined in a general dictionary can be interpreted as the same or similar meanings as the contextual meanings of a related technology, and are not interpreted as ideal or excessively formal meanings unless defined clearly in the present disclosure. According to cases, even the term defined in the present disclosure cannot be interpreted to exclude example embodiments of the present disclosure.

An electronic device according to various example embodiments of the present disclosure can include at least one of a smart phone, a tablet Personal Computer (PC), a mobile phone, a video phone, an electronic book (e-book) reader, a desktop Personal Computer (PC), a laptop PC, a netbook computer, a workstation, a server, a Personal Digital Assistant (PDA), a Portable Multimedia Player (PMP), a Moving Picture Experts Group (MPEG-1 or MPEG-2) Audio Layer 3 (MP3) player, a mobile medical instrument, a camera, or a wearable device, or the like, but is not limited thereto. According to various example embodiments, the wearable device can include at least one of an accessory type (e.g., a watch, a ring, a wristlet, an anklet, a necklace, glasses, a contact lens, or a Head-Mounted-Device (HMD)), a fabric or clothing integrated type (e.g., electronic clothes), a body mount type (e.g., a skin pad or tattoo), or a bio implantation type (e.g., an implantable circuit), or the like, but is not limited thereto.

In some example embodiments, the electronic device can be a home appliance. The home appliance can, for example, include at least one of a television (TV), a Digital Video Disk (DVD) player, an audio system, a refrigerator, an air conditioner, a cleaner, an oven, a microwave, a washing machine, an air cleaner, a set-top box, a home automation control panel, a security control panel, a TV box (for example, Samsung HomeSync®, Apple TV®, or Google TV®), a game console (e.g., Xbox®, PlayStation®), an electronic dictionary, an electronic locking system, a camcorder, or an electronic frame, or the like, but is not limited thereto.

In another example embodiment, the electronic device can include at least one of various medical instruments (e.g., various portable medical measurement instruments (i.e., a blood sugar measuring instrument, a heartbeat measuring instrument, a blood pressure measurement instrument, a body temperature measurement instrument, etc.), Magnetic Resonance Angiography (MRA), Magnetic Resonance Imaging (MRI), Computerized Tomography (CT), a photographing machine, an ultrasonic machine, etc.), a navigation device, a Global Navigation Satellite System (GNSS), an Event Data Recorder (EDR), a Flight Data Recorder (FDR), a car infotainment device, an electronic equipment for ship (e.g., a navigation device for ship, a gyrocompass, etc.), avionics, a security instrument, a head unit for car, an industrial or home robot, an Automatic Teller's Machine (ATM) of a financial institution, a Point Of Sales (POS) of a shop, or an Internet of Things (IoT) device (e.g., an electric bulb, various sensors, an electricity or gas meter, a sprinkler device, a fire alarm, a thermostat, a streetlight, a toaster, an exerciser, a hot water tank, a heater, a boiler, etc.), or the like, but is not limited thereto.

According to various example embodiments of the present disclosure, the electronic device can include at least one of a part of furniture or building/structure, an electronic board, an electronic signature receiving device, a projector, or various metering instruments (e.g., tap water, electricity, gas, a radio wave metering instrument, etc.), or the like, but is not limited thereto. In various embodiments of the present disclosure, the electronic device can be a combination of one or more of the aforementioned devices. The electronic device according to various embodiments can be a flexible electronic device. Also, the electronic device according to various embodiments of the present disclosure is not limited to the aforementioned instruments, and can include a new electronic device according to the development of a technology and as would be understood to be covered by the person of ordinary skill in the art.

An electronic device according to various example embodiments of the present disclosure is described below with reference to the accompanying drawings. In the present disclosure, the term 'user' can denote a person who uses the electronic device or a device (e.g., an artificial-intelligent electronic device) which uses the electronic device.

Referring to FIG. 1, an electronic device 101 within a network environment 100 in various example embodiments is mentioned. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. In any example embodiment, the electronic device 101 can omit at least one of the constituent elements or additionally have another constituent element.

The bus 110 can, for example, include a circuit coupling the constituent elements 110 to 170 with one another and forwarding communication (e.g., a control message and/or data) between the constituent elements.

The processor 120 can include various processing circuitry, such as, for example, and without limitation, one or more of a dedicated processor, a Central Processing Unit (CPU), an Application Processor (AP), or a Communication Processor (CP). The processor 120 can, for example, execute computation or data processing for control and/or communication of at least one otherwise constituent element of the electronic device 101.

The memory 130 can include a volatile and/or nonvolatile memory. The memory 130 can, for example, store an instruction or data related with at least one otherwise constituent element of the electronic device 101. According to one example embodiment, the memory 130 can store a software and/or program 140. The program 140 can, for example, include a kernel 141, a middleware 143, an Application Programming Interface (API) 145, an application program (or "application") 147, etc. At least a part of the kernel 141, the middleware 143, or the API 145 can be called an Operating System (OS).

The kernel 141 can, for example, control or manage system resources (e.g., the bus 110, the processor 120, the memory 130, etc.) that are used for executing operations or functions implemented in other programs (e.g., the middleware 143, the API 145, or the application program 147). Also, the kernel 141 can provide an interface capable of controlling or managing the system resources by enabling the middleware 143, the API 145, or the application program 147 to gain access to the individual constituent element of the electronic device 101.

The middleware 143 can, for example, perform a relay role of enabling the API 145 or the application program 147 to communicate and exchange data with the kernel 141.

Also, the middleware 143 can process one or more work requests received from the application program 147 in accordance with the order of priority. For example, the middleware 143 can grant the order of priority capable of using the system resources (e.g., the bus 110, the processor 120, the memory 130, etc.) of the electronic device 101 to at least one of the application programs 147. For instance, the middleware 143 can perform scheduling, load balancing, etc. for the one or more work requests, by processing the one or more work requests in accordance with the priority order granted to the at least one of the application programs 147.

The API 145 is, for example, an interface enabling the application program 147 to control a function of the kernel 141 or the middleware 143, and can, for example, include at least one interface or function (e.g., an instruction) for file control, window control, image processing, character control, etc.

The input/output interface 150 may include various input/output circuitry that can, for example, play a role of an interface capable of forwarding an instruction or data inputted from a user or another external device, to the other constituent element(s) of the electronic device 101. Also, the input output interface 150 can output an instruction or data received from the other constituent element(s) of the electronic device 101, to the user or another external device.

The display 160 can, for example, include a Liquid Crystal Display (LCD), a Light Emitting Diode (LED) display, an Organic Light Emitting Diode (OLED) display, or a MicroElectroMechanical Systems (MEMS) display, or an electronic paper display, or the like, but is not limited thereto. The display 160 can, for example, display various contents (e.g., a text, an image, a video, an icon, a symbol, etc.) to a user. The display 160 can include a touch screen and, for example, can receive a touch, gesture, proximity, or hovering input that uses an electronic pen or a part of the user's body.

The communication interface 170 may include various communication circuitry that can, for example, establish communication between the electronic device 101 and an external device (e.g., a first external electronic device 102, a second external electronic device 104, or a server 106). For example, the communication interface 170 can be coupled to a network 162 through a wireless communication or wired communication, and communicate with the external device (e.g., the second external electronic device 104 or server 106).

The wireless communication is, for example, a cellular communication protocol and can, for example, use at least one of Long Term Evolution (LTE), LTE-Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), etc. Also, the wireless communication can, for example, include a short-range communication 164. The short-range communication 164 can, for example, include at least one of Wireless Fidelity (WiFi), Bluetooth (BT), Near Field Communication (NFC), Global Navigation Satellite System (GNSS), etc. In accordance with a use area, a bandwidth, etc., the GNSS can, for example, include at least one of a Global Positioning System (GPS), a Global navigation satellite system (Glonass), a Beidou navigation satellite system (hereinafter, "Beidou"), Galileo, or the European global satellite-based navigation system. Below, in the present disclosure, the "GPS" can be used interchangeably with the "GNSS". The wired communication can, for example, include at least one of a Universal Serial Bus (USB), a High Definition Multimedia Interface (HDMI), a Recommended Standard-232 (RS-232), a Plain Old Telephone Service (POTS), etc. The network 162 can include at least one of a telecommunications network, for example, a computer network (e.g., Local Area Network (LAN) or Wide Area Network (WAN)), the Internet, or a telephone network.

The first and second electronic devices 102 and 104 each can be a device of a kind identical with or different from that of the electronic device 101. According to one example embodiment, the server 106 can include a group of one or more servers. According to various example embodiments, all or some of operations executed in the electronic device 101 can be executed in another or a plurality of electronic devices (e.g., the first and second electronic device 102 and 104 or the server 106). According to one example embodiment, in case where the electronic device 101 has to perform any function or service automatically or in response to a request, the electronic device 101 can request at least a partial function associated with this to another electronic device (e.g., the electronic device 102, 104 or the server 106) instead of or additionally to executing the function or service in itself. The another electronic device (e.g., the electronic device 102, 104 or the server 106) can execute the requested function or additional function, and forward the result to the electronic device 101. The electronic device 101 can process the received result as it is or additionally, and provide the requested function or service. For this, a cloud computing, distributed computing, or client-server computing technology can be used, for example.

Figure 2:
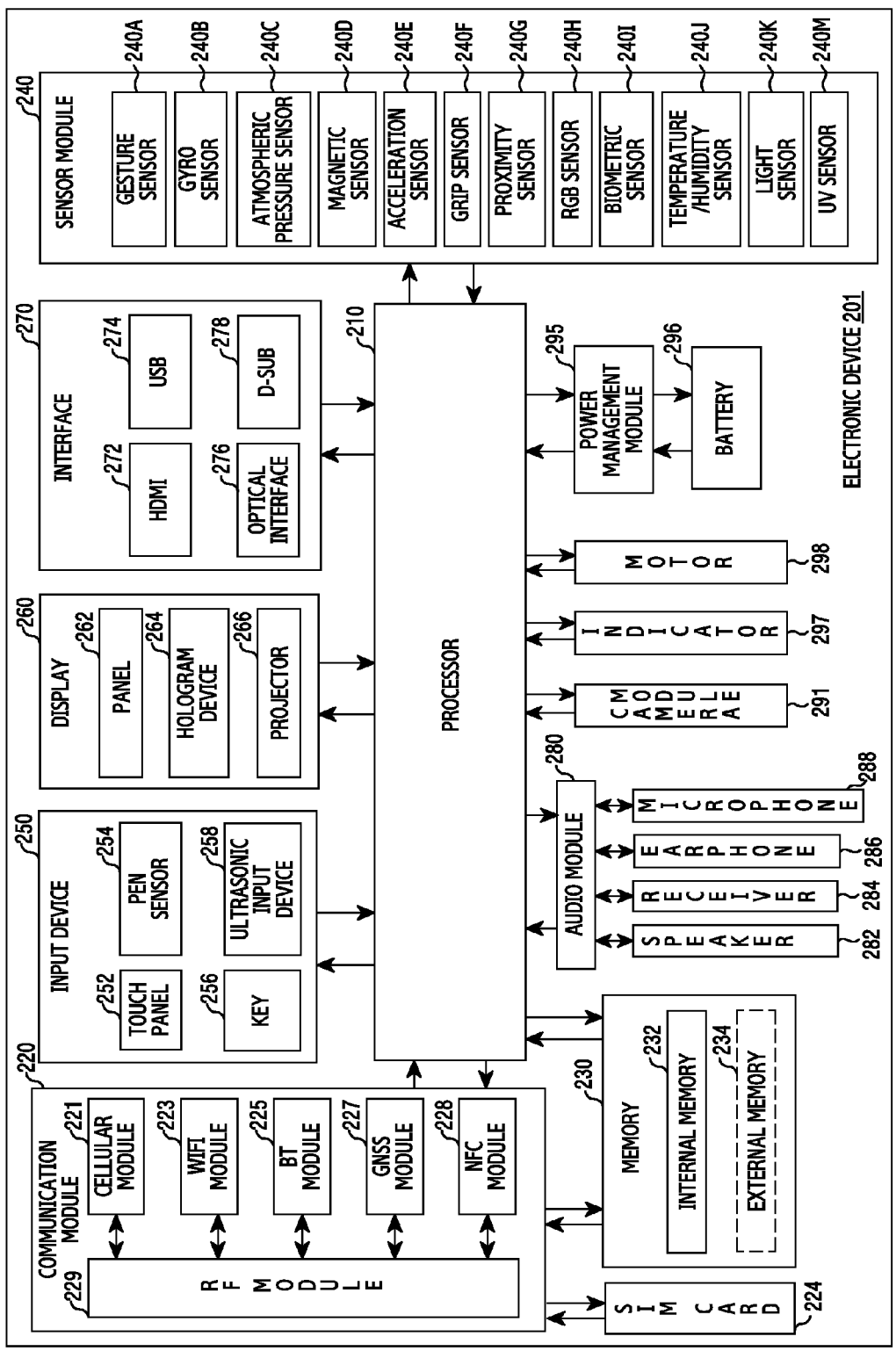
FIG. 2 is a block diagram illustrating an example configuration of an electronic device according to various example embodiments of the present disclosure.

FIG. 2 is a block diagram illustrating an example configuration of an electronic device 201 according to various example embodiments of the present disclosure. Referring to FIG. 2, the electronic device 201 may include, for example, the whole or part of the electronic device 101 illustrated in FIG. 1. The electronic device 201 may include at least one processor (e.g., an Application Processor (AP)) (e.g., including processing circuitry) 210, a communication module (e.g., including communication circuitry) 220, a subscriber identification module 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry configured to control multiple hardware or software elements connected to the processor 210 and may perform the processing of and arithmetic operations on various data, by running, for example, an Operating System (OS) or an application program. The processor 210 may be implemented by, for example, a System on Chip (SoC). According to an embodiment of the present disclosure, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store the resulting data in a non-volatile memory.

The communication module 220 may have a configuration identical or similar to that of the communication interface 170. The communication module 220 may include various communication circuitry, such as, for example, and without limitation, the cellular module 221, a Wi-Fi module 223, a Bluetooth (BT) module 225, a Global Navigation Satellite System (GNSS) module 227, a Near Field Communication (NFC) module 228, and a Radio Frequency (RF) module 229. For example, the cellular module 221 may provide a voice call, a video call, a text message service, an Internet service, and the like through a communication network. According to an embodiment of the present disclosure, the cellular module 221 may identify or authenticate an electronic device 201 in the communication network by using the subscriber identification module (e.g., a Subscriber Identity Module (SIM) card) 224. According to an embodiment of the present disclosure, the cellular module 221 may perform at least some of the functions that the processor 210 may provide. According to an embodiment of the present disclosure, the cellular module 221 may include a Communication Processor (CP). According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package. The RF module 229 may transmit and receive, for example, communication signals (e.g., RF signals). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an internal memory 232 and/or an external memory 234. The internal memory 232 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory, a hard drive, and a Solid State Drive (SSD)). The external memory 234 may include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally or physically connected to the electronic device 201 through various interfaces.

For example, the sensor module 240 may measure a physical quantity or may detect an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a Red-Green-Blue (RGB) sensor), a biometric sensor 240I, a temperature/humidity sensor 240J, an illuminance (e.g., light) sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, and an ultrasonic input unit 258. The touch panel 252 may use at least one of, for example, a capacitive scheme, a resistive scheme, an infrared scheme, and an acoustic wave scheme. Also, the touch panel 252 may further include a control circuit. The touch panel 252 may further include a tactile layer and may provide a tactile reaction to the user. The (digital) pen sensor 254 may include, for example, a recognition sheet which is a part of the touch panel or is separated from the touch panel. The key 256 may be, for example, a physical button, an optical key, and a keypad. The ultrasonic input unit 258 may sense an ultrasonic wave generated by an input means through a microphone (e.g., a microphone 288), and may confirm data corresponding to the sensed ultrasonic wave.

The display 260 (e.g., the display 160) may include a panel 262, a hologram unit 264, a projector 266, and/or a control circuit for controlling the same. The panel 262 may be implemented to be, for example, flexible, transparent, or wearable. The panel 262 together with the touch panel 252 may be implemented as one or more modules. The hologram unit 264 may display a three-dimensional image in the air by using the interference of light. The projector 266 may display an image by projecting light onto a screen. The screen may be located, for example, inside or outside the electronic device 201.

The interface 270 may include various interface circuitry, such as, for example, and without limitation, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 150 illustrated in FIG. 1. The audio module 280 may process sound information which is input or output through, for example, a speaker 282, a receiver 284, an earphone 286, the microphone 288, or the like. The camera module 291 is, for example, a device capable of capturing a still image and a moving image. According to an embodiment of the present disclosure, the camera module 291 may include one or more image sensors (e.g., a front sensor or a back sensor), a lens, an Image Signal Processor (ISP), and a flash (e.g., an LED, a xenon lamp, or the like). The power management module 295 may manage, for example, power of the electronic device 201. According to an embodiment of the present disclosure, the power management module 295 may include a Power Management Integrated Circuit (PMIC), a charger IC, or a battery fuel gauge. The PMIC may use a wired and/or wireless charging method. Examples of the wireless charging method may include, for example, a magnetic resonance method, a magnetic induction method, an electromagnetic method, and the like. The PMIC may further include additional circuits (e.g., a coil loop, a resonance circuit, a rectifier, etc.) for wireless charging. The battery fuel gauge may measure, for example, a residual quantity of the battery 296, and a voltage, a current, or a temperature during the charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include a mobile television (TV) support unit (e.g., a GPU) that may process media data according to a standard, such as, for example, Digital Multimedia Broadcasting (DMB), Digital Video Broadcasting (DVB), or mediaFLO™. Each of the above-described elements of hardware according to the present disclosure may be configured with one or more components, and the names of the corresponding elements may vary based on the type of electronic device. In various embodiments of the present disclosure, the electronic device (e.g., the electronic device 201) may omit some elements or may further include additional elements, or some of the elements of the electronic device may be combined into one entity, which may perform functions identical to those of the relevant elements before the combination.

Figure 3:
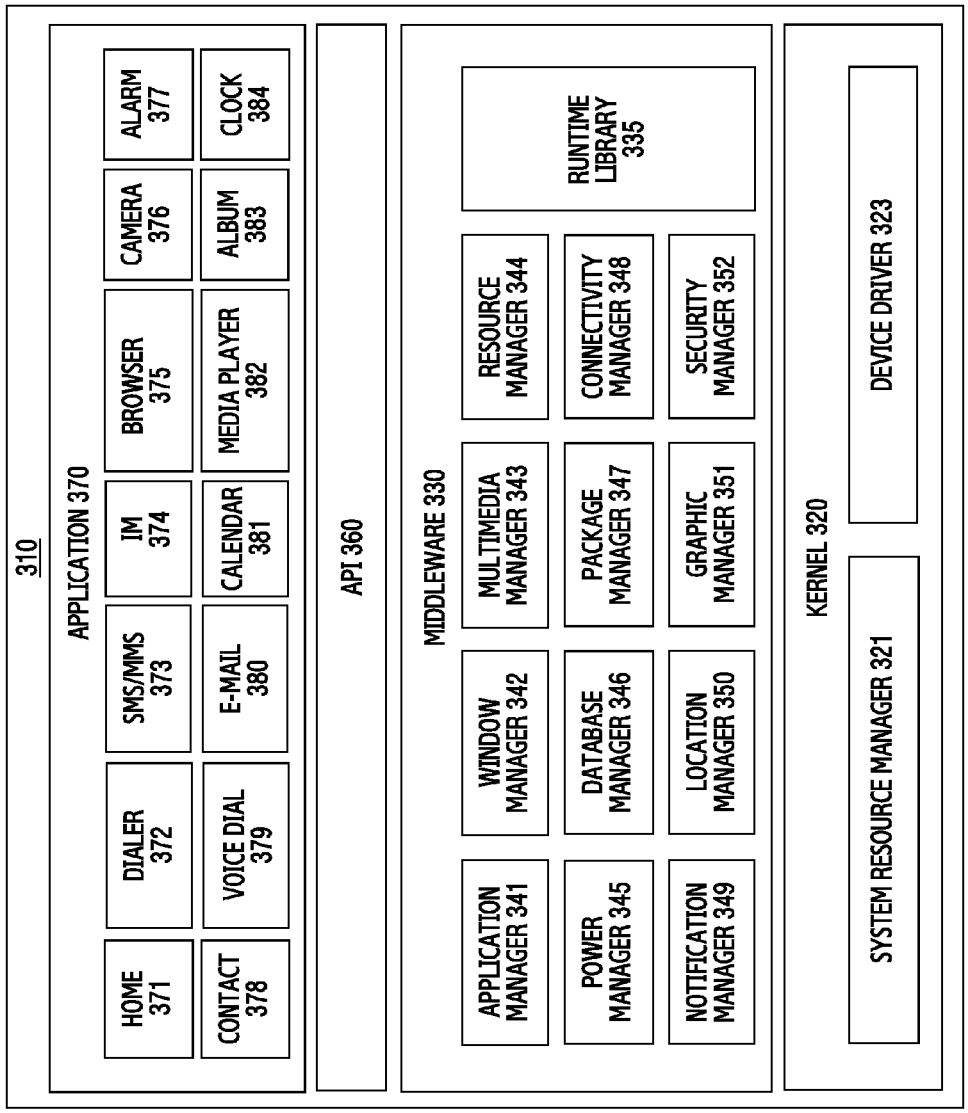
FIG. 3 is a block diagram illustrating an example configuration of a program module according to various example embodiments of the present disclosure.

FIG. 3 is a block diagram illustrating an example configuration of a program module according to various example embodiments of the present disclosure. According to an embodiment of the present disclosure, the program module 310 (e.g., the program 140) may include an OS for controlling resources related to the electronic device (e.g., the electronic device 101) and/or various applications (e.g., the application programs 147) executed in the OS. The OS may be, for example, Android™, iOS™, Windows™, Symbian™, Tizen™, Bada™, and the like. Referring to FIG. 3, the program module 310 may include a kernel 320 (e.g., the kernel 141), middleware 330 (e.g., the middleware 143), an Application Programming Interface (API) 360 (e.g., the API 145), and/or an application 370 (e.g., the application program 147). At least some of the program module 310 may be preloaded on the electronic device, or may be downloaded from an external electronic device (e.g., the electronic device 102 or 104, or the server 106).

The kernel 320 may include, for example, a system resource manager 321 and/or a device driver 323. The system resource manager 321 may control, allocate, or retrieve system resources. According to an embodiment of the present disclosure, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 330 may provide a function required in common by the applications 370, or may provide various functions to the applications 370 through the API 360 so as to enable the applications 370 to use the limited system resources within the electronic device.

According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may manage input/output, manage a memory, or process an arithmetic function. The application manager 341 may manage, for example, the life cycle of the application 370. The window manager 342 may manage Graphical User Interface (GUI) resources used for the screen. The multimedia manager 343 may determine formats required to reproduce media files, and may encode or decode a media file by using a coder/decoder (codec) appropriate for the relevant format. The resource manager 344 may manage a source code of the application 370 or a memory space for the application 370. For example, the power manager 345 may manage the capacity of a battery or power, and may provide power information required for an operation of the electronic device. According to an embodiment of the present disclosure, the power manager 345 may operate in conjunction with a Basic Input/Output System (BIOS). The database manager 346 may, for example, generate, search, or change a database to be used by the application 370. The package manager 347 may manage the installation or update of an application distributed in the form of a package file.

For example, the connectivity manager 348 may manage a wireless connection. The notification manager 349 may provide a user with an event, such as an arrival message, an appointment, a proximity notification, and the like. For example, the location manager 350 may manage location information of the electronic device. For example, the graphic manager 351 may manage a graphic effect, which is to be provided to the user, or a user interface related to the graphic effect. For example, the security manager 352 may provide system security or user authentication. According to an embodiment of the present disclosure, the middleware 330 may include a telephony manager for managing a voice call function or a video call function of the electronic device, or may include a middleware module capable of forming a combination of functions of the above-described elements. According to an embodiment of the present disclosure, the middleware 330 may provide a module specialized for each type of OS. The middleware 330 may dynamically delete some of the existing elements, or may add new elements. The API 360 is, for example, a set of API programming functions, and may be provided with a different configuration for each OS. For example, in the case of Android or iOS, one API set may be provided for each platform. In the case of Tizen, two or more API sets may be provided for each platform.

The application 370 may include, for example, a home 371, a dialer 372, an SMS/MMS 373, an Instant Message (IM) 374, a browser 375, a camera 376, an alarm 377, a contact 378, a voice dialer 379, an email 380, a calendar 381, a media player 382, an album 383, a clock 384, health care (e.g., which measures an exercise quantity, a blood sugar level, or the like), and an application for providing environmental information (e.g., information on atmospheric pressure, humidity, or temperature). According to an embodiment of the present disclosure, the application 370 may include an information exchange application capable of supporting information exchange between the electronic device and an external electronic device. The information exchange application may include, for example, a notification relay application for delivering particular information to the external electronic device or a device management application for managing the external electronic device. For example, the notification relay application may deliver, to the external electronic device, notification information generated by the other applications of the electronic device, or may receive notification information from the external electronic device and may provide the received notification information to the user. The device management application may install, delete, or update, for example, a function (e.g., turning on/off the external electronic device itself (or some elements thereof) or adjusting the brightness (or resolution) of the display) of the external electronic device communicating with the electronic device, or an application executed in the external electronic device. According to an embodiment of the present disclosure, the application 370 may include an application (e.g., a health care application of a mobile medical device) designated according to an attribute of the external electronic device. According to an embodiment of the present disclosure, the application 370 may include an application received from the external electronic device. At least part of the program module 310 may be implemented (e.g., executed) in software, firmware, hardware (e.g., the processor 210), or at least two combinations thereof, and may include a module, a program, a routine, a set of instructions, or a process for performing one or more functions.

The term "module" as used herein may refer to a unit including hardware, software, or firmware, and for example, may be used interchangeably with a term, such as a logic, a logical block, a component, or a circuit. The "module" may be an integrated component, or a minimum unit for performing one or more functions or a part thereof. The "module" may be mechanically or electronically implemented, and may include, for example, a dedicated processor, a CPU, an Application-Specific Integrated Circuit (ASIC) chip, a Field-Programmable Gate Array (FPGA), or a programmable-logic device which performs certain operations and has been known or is to be developed in the future.

At least part of the device (e.g., modules or functions thereof) or the method (e.g., operations) according to various embodiments of the present disclosure may be implemented by an instruction stored in a computer-readable storage medium (e.g., the memory 130) provided in the form of a program module. When the instruction is executed by a processor (e.g., the processor 120), the processor may perform a function corresponding to the instruction. The computer-readable recoding medium may include magnetic media, such as a hard disk, a floppy disk, and a magnetic tape; optical media, such as a Compact Disc Read Only Memory (CD-ROM) and a Digital Versatile Disc (DVD); magneto-optical media, such as a floptical disk; an internal memory; and the like. The instructions may include codes made by a compiler and/or codes which can be executed by an interpreter.

Figure 4:
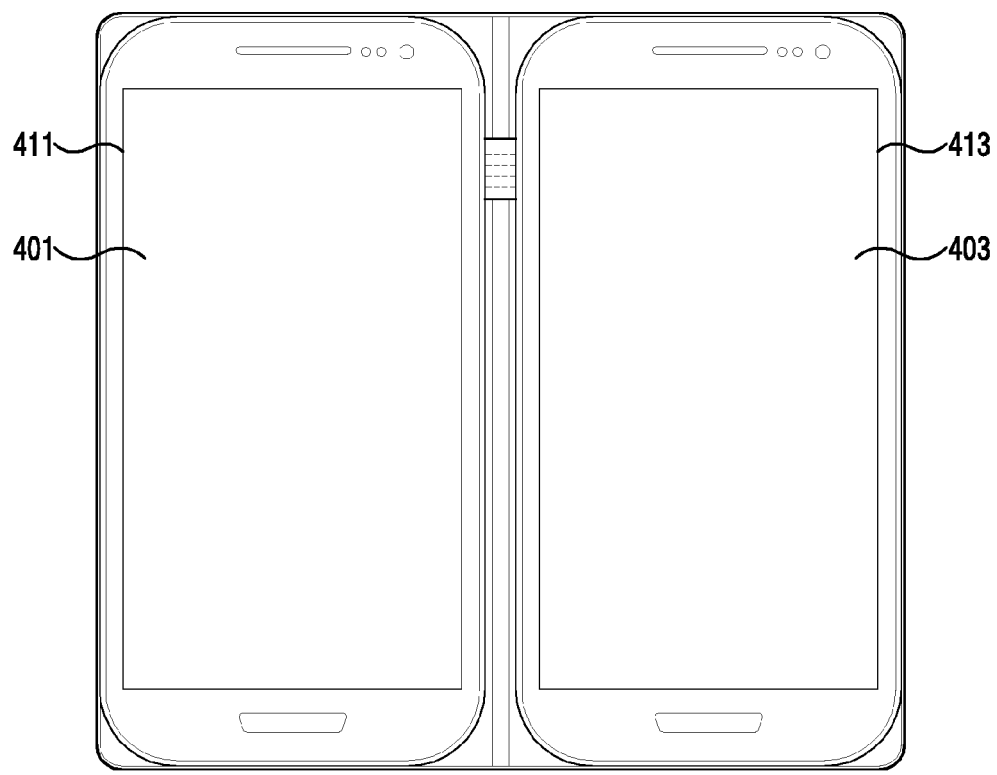
FIG. 4 is diagram illustrating an appearance of an electronic device according to various example embodiments of the present disclosure.
Figure 5:
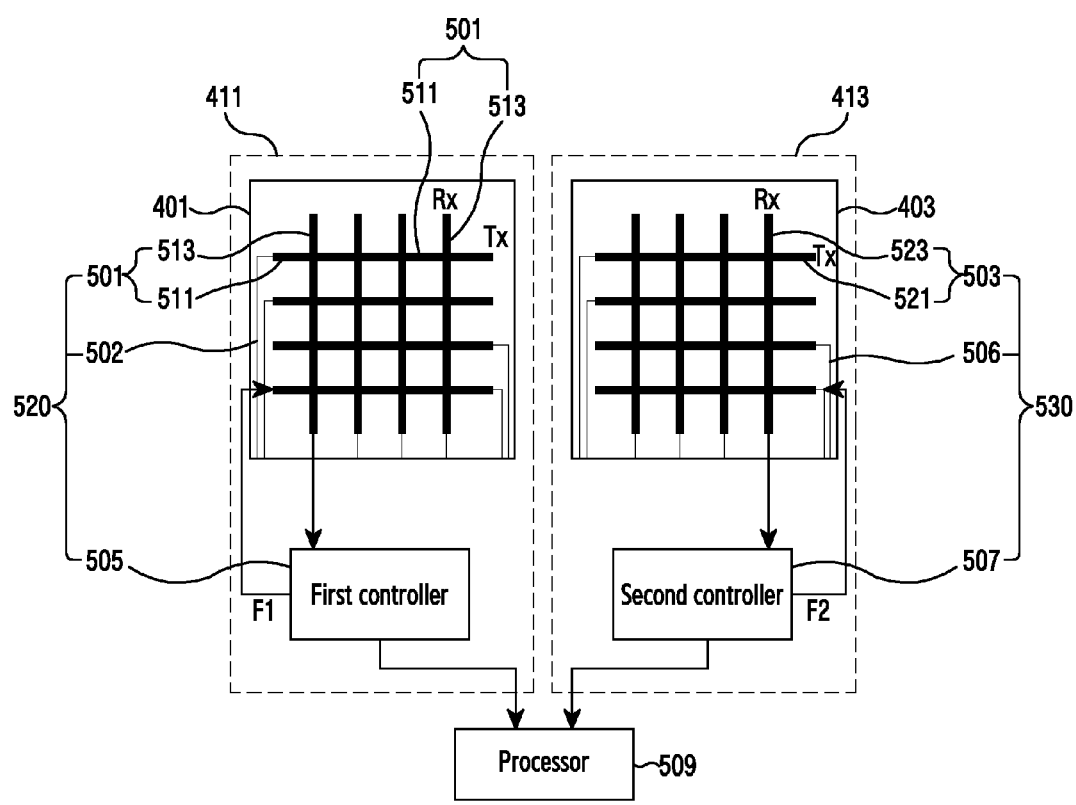
FIG. 5 is a block diagram illustrating an example configuration of an electronic device according to various example embodiments of the present disclosure.
Figure 6:
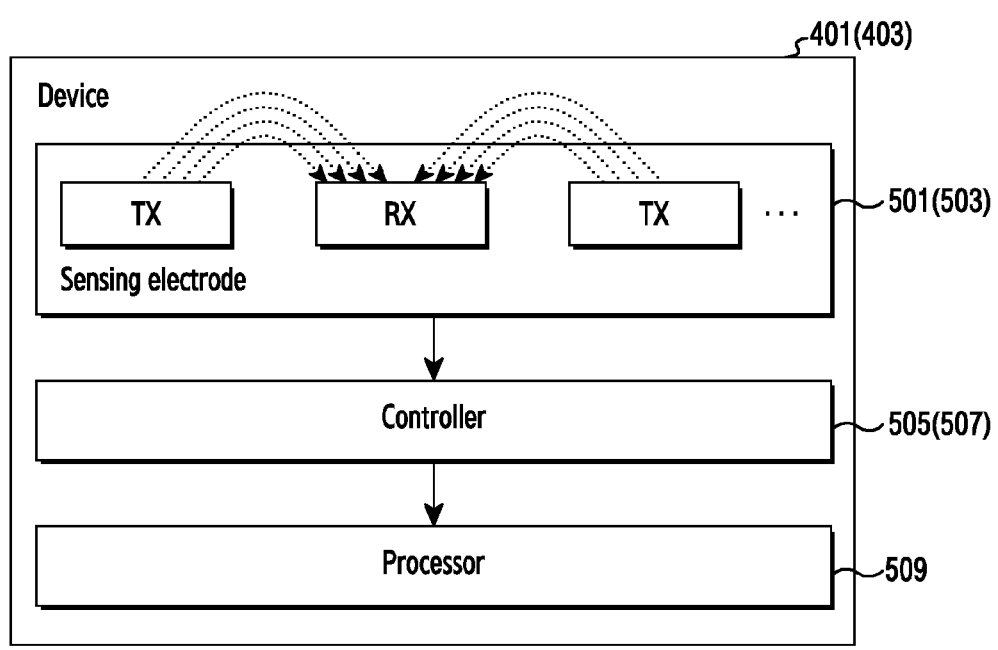
FIGS. 6, 7, 8 and 9 are diagrams illustrating an example method of operating an electronic device according to various example embodiments of the present disclosure.

FIG. 4 is diagram illustrating an appearance of an example electronic device according to various example embodiments of the present disclosure. FIG. 5 is a block diagram illustrating an example configuration of an electronic device according to various example embodiments of the present disclosure. FIGS. 6, 7, 8 and 9 are diagrams illustrating an example method of operating an electronic device according to various example embodiments of the present disclosure.

Referring to FIGS. 4 and 5, the electronic device 101 according to various embodiments of the present disclosure may include multiple devices and a processor 509. As illustrated in FIG. 4, the devices may include a first device 401 and a second device 403. However, an embodiment of the present disclosure is not limited to this configuration, and the electronic device may further include an additional device as well as the first device 401 and the second device 403. The electronic device according to various embodiments of the present disclosure may include a first area 411 and a second area 413.

The first device 401 may be disposed in the first area 411. The first device 401 may include a touch input apparatus. The first device 401 may correspond to the input apparatus 250 described with reference to FIG. 2. The first device 401 may be a touch window. The first device 401 may include, for example, a first touch sensing circuit 520. The first touch sensing circuit 520 may include a first sensing electrode 501, a first wiring 502, and a first controller 505.

The first sensing electrode 501 may include a first transmission electrode 511 and a first reception electrode 513. The multiple first transmission electrodes 511 may be disposed in a first direction (e.g., an X-axis direction). The first reception electrode 513 may be disposed to intersect with the first transmission electrode 511. The multiple first reception electrodes 513 may be disposed in a second direction (e.g., a Y-axis direction).

The first sensing electrode 501 may include a conductive material. For example, the first sensing electrode 501 may include various conductive materials, such as Indium Tin Oxide (ITO), Indium Zinc Oxide (IZO), Zinc Oxide (ZnO), graphene, carbon nanotube, Silver Nanowires (AgNW), conductive polymer, conductive metal, and the like.

The first sensing electrode 501 may have various patterns. For example, the first sensing electrode 501 may have patterns of various polygon shapes, such as rhombus, diamond, rectangle, triangle, and the like.

An insulating layer (not illustrated) for preventing electrical short-circuiting may be disposed between the first transmission electrode 511 and the first reception electrode 513. The insulating layer may be wholly disposed between the first transmission electrode 511 and the first reception electrode 513. Alternatively, the insulating layer may be partially disposed at only an intersection part between the first transmission electrode 511 and the first reception electrode 513.

The first transmission electrode 511 may receive a driving signal from the first controller 505. The first reception electrode 513 may sense a change in a capacitance according to a touch, and may deliver a sensing signal to the first controller 505.

The first wiring 502 may be electrically connected to the first sensing electrode 501. The first wiring 502 may be electrically connected to each of the first transmission electrode 511 and the first reception electrode 513. The first wiring 502 may deliver a sensing signal of the first sensing electrode 501 to the first controller 505 through a connection pad (not illustrated). The first wiring 502 may include a conductive material. For example, the first wiring 502 may have a structure of a monolayer film or multilayer film including one or more of gold (Au), silver (Ag), copper (Cu), aluminum (Al), nickel (Ni), tungsten (W), titanium (Ti), platinum (Pt), palladium (Pd), tin (Sn), lead (Pb), zinc (Zn), indium (In), cadmium (Cd), chrome (Cr), molybdenum (Mo), iron (Fe), cobalt (Co), magnesium (Mg), tantalum (Ta), and manganese (Mn).

The first controller 505 may apply a driving signal to the first transmission electrode 511. The first controller 505 may detect a change in a capacitance as a sensing signal from the first reception electrode 513.

The first controller 505 may be configured to cause the first device 401 to use a first frequency. The first controller 505 may be configured to cause a driving signal applied to the first transmission electrode 511 of the first sensing electrode 501 to have the first frequency. For example, the first frequency is higher than or equal to 250 kHz.

Figure 7:
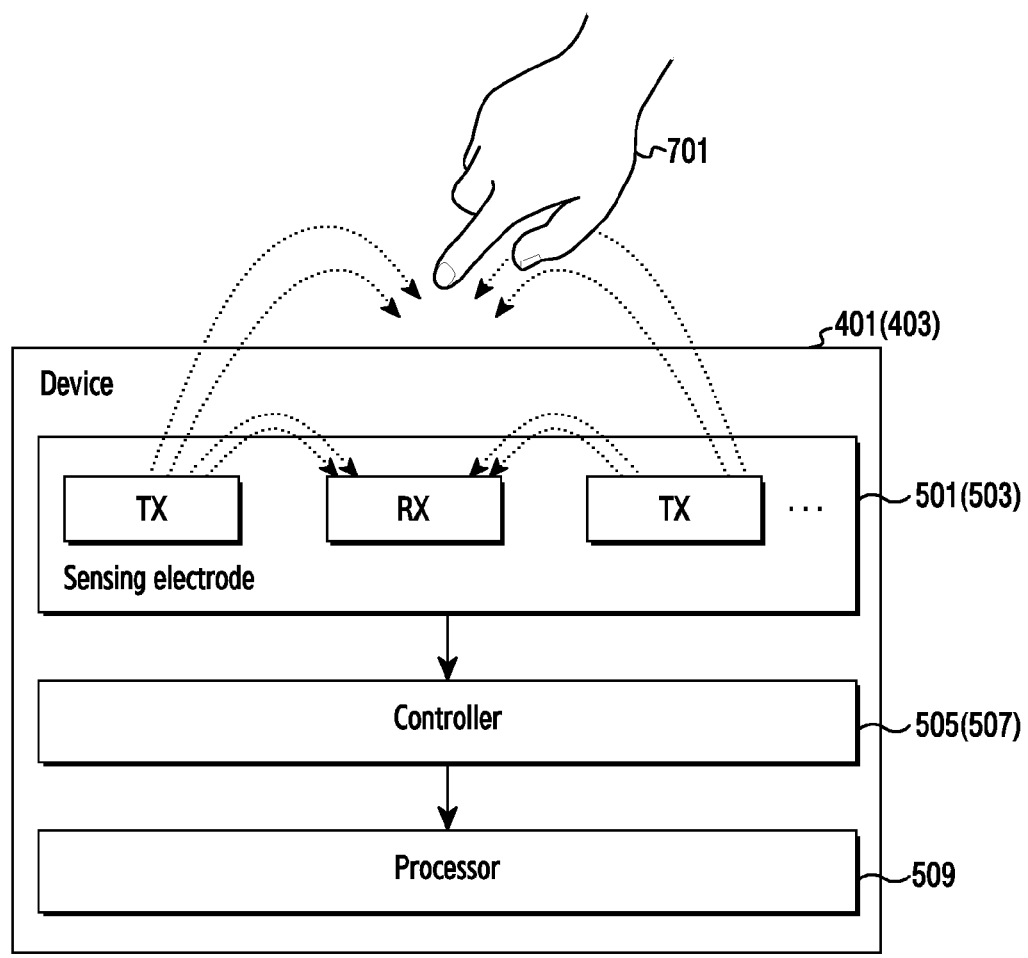
Figure 8:
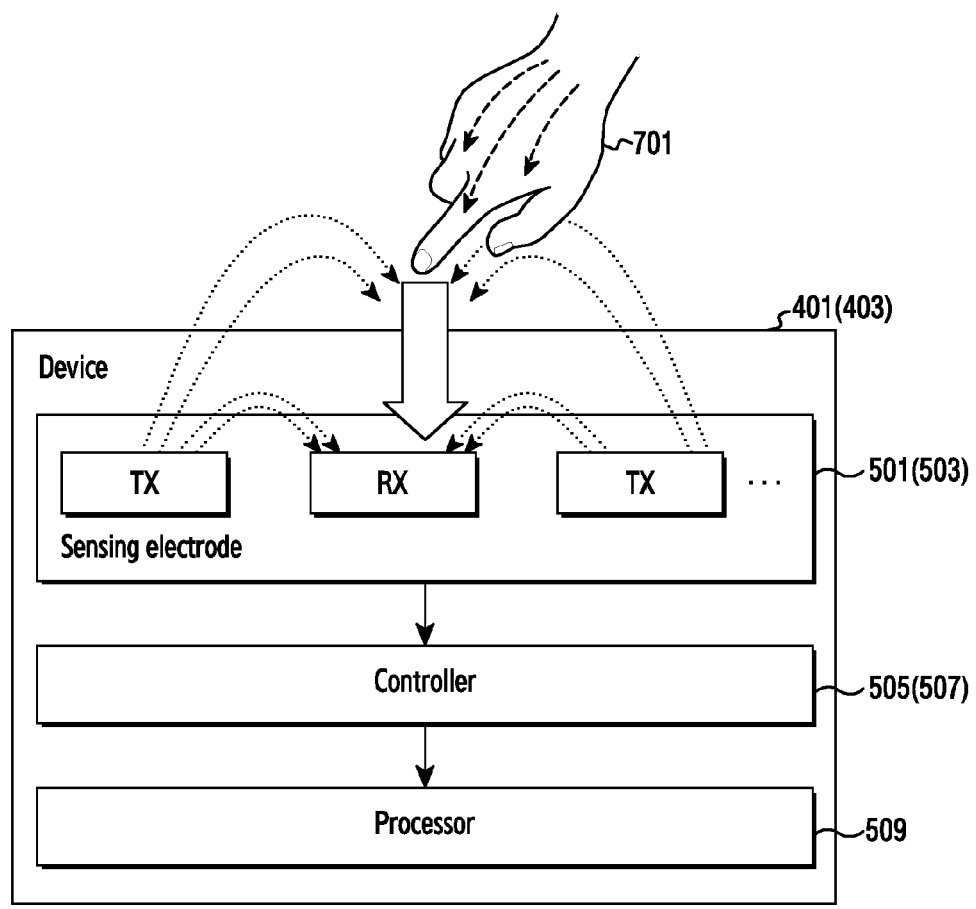

The first touch sensing circuit 520 may detect a touch position. Specifically, referring to FIG. 6, a mutual capacitance is generated between the first transmission electrode 511 and the first reception electrode 513. The value of a mutual capacitance is formed between the first transmission electrode 511 and the first reception electrode 513 at each point at which the first transmission electrode 511 intersects with the first reception electrode 513. Referring to FIGS. 7 and 8, when an input tool 701 (e.g., a finger of the user, a stylus, or the like) approaches or contacts the first transmission electrode 511 and the first reception electrode 513, the capacitance between the first transmission electrode 511 and the first reception electrode 513 is changed. According to various embodiments of the present disclosure, the input tool 701 may cause a part of the value of the mutual capacitance, which is formed at the point at which the first transmission electrode 511 intersects with the first reception electrode 513, to move to the input apparatus 701 due to a virtual ground phenomenon of the input tool 701. Accordingly, the value of the mutual capacitance may be reduced at the point at which the first transmission electrode 511 intersects with the first reception electrode 513, and the change in the capacitance may be sensed through the first reception electrode 513. Through this configuration, the contact of the input tool 701 may be detected, and coordinates of a touch position may be calculated.

The second device 403 may be disposed in the second area 413. The second device 403 may be disposed adjacent to the first device 401. The second device 403 may include a touch input apparatus. The second device 403 may correspond to the input apparatus 250 described with reference to FIG. 2. The second device 403 may be a touch window. The second device 403 may include, for example, a second touch sensing circuit 530. The second touch sensing circuit 530 may include a second sensing electrode 503, a second wiring 506, and a second controller 507.

The second sensing electrode 503 may be similar to the first sensing electrode 501. The second sensing electrode 503 may include a second transmission electrode 521 and a second reception electrode 523. The multiple second transmission electrodes 521 may be disposed in the first direction (e.g., the X-axis direction). The second transmission electrode 521 may receive a driving signal from the second controller 507. The second reception electrode 523 may be disposed to intersect with the second transmission electrode 521. The multiple second reception electrodes 523 may be disposed in the second direction (e.g., the Y-axis direction). The second reception electrode 523 may sense a change in a capacitance according to a touch.

The second sensing electrode 503 may include a conductive material. For example, the second sensing electrode 503 may include various conductive materials, such as ITO, IZO, ZnO, graphene, carbon nanotube, AgNW, conductive polymer, conductive metal, and the like.

The second sensing electrode 503 may have various patterns. For example, the second sensing electrode 503 may have patterns of various polygon shapes, such as rhombus, diamond, rectangle, triangle, and the like.

An insulating layer (not illustrated) for preventing electrical short-circuiting may be disposed between the second transmission electrode 521 and the second reception electrode 523. The insulating layer may be wholly disposed between the second transmission electrode 521 and the second reception electrode 523. Alternatively, the insulating layer may be partially disposed at only an intersection part between the second transmission electrode 521 and the second reception electrode 523.

The second transmission electrode 521 of the second sensing electrode 503 may receive a driving signal from the second controller 507. The second reception electrode 523 of the second sensing electrode 503 may sense a change in a capacitance according to a touch, and may deliver a sensing signal to the second controller 507.

The second wiring 506 may be electrically connected to the second sensing electrode 503. The second wiring 506 may be electrically connected to each of the second transmission electrode 521 and the second reception electrode 523 of the second sensing electrode 503. The second wiring 506 may deliver a sensing signal of the second sensing electrode 503 to the second controller 507 through a connection pad (not illustrated). The second wiring 506 may include a conductive material. For example, the second wiring 506 may have a structure of a monolayer film or multilayer film including one or more of gold (Au), silver (Ag), copper (Cu), aluminum (Al), nickel (Ni), tungsten (W), titanium (Ti), platinum (Pt), palladium (Pd), tin (Sn), lead (Pb), zinc (Zn), indium (In), cadmium (Cd), chrome (Cr), molybdenum (Mo), iron (Fe), cobalt (Co), magnesium (Mg), tantalum (Ta), and manganese (Mn).

The second controller 507 may apply a driving signal to the second transmission electrode 521 of the second sensing electrode 503. The second controller 507 may detect a change in a capacitance as a sensing signal from the second reception electrode 523 of the second sensing electrode 503.

The second controller 507 may be configured to cause the second device 403 to use a second frequency. The second controller 507 may be configured to cause a driving signal applied to the second transmission electrode 521 of the second sensing electrode 503 to have the second frequency. For example, the second frequency is higher than or equal to 250 kHz.

The first frequency F1 may at least temporarily differ from the second frequency F2 while the electronic device operates. The first frequency F1 and the second frequency F2 may at least partially changed while the first frequency F1 and the second frequency F2 operate. For example, in a state where default frequencies of the first frequency F1 and the second frequency F2 are set to be identical to each other, when it is sensed that both the first device 401 and the second device 403 operate, the first frequency F1 may temporarily differ from the second frequency F2. Specifically, in the state where the default frequencies of the first and second frequencies F1 and F2 are set to be identical to each other, when it is sensed that at least one of the first device 401 and the second device 403 is in an off-state, the other device that is in an on-state among the first device 401 and the second device 403 may operate at the set default frequency. At this time, when, according to a change of the state of the device in the off-state to the on-state, both the first device 401 and the second device 403 are sensed as operating, the first frequency F1 of the first device 401 may be variably changed to a frequency, which does not affect the second frequency F2 of the second device 403, by using a variable frequency scheme such as a frequency hopping and the like. Alternatively, when a change of the state of the device in the off-state to the on-state is sensed, the second frequency F2 of the second device 403 may be variably changed to a frequency, which does not affect the first device 401, by using the variable frequency scheme. For example, when the first device 401 is in the off-state and the second device 403 is in the on-state, the second device 403 may operate at the second frequency F2 which is the default frequency. At this time, when a change of the state of the first device 401 to the on-state is sensed, the first device 401 may operate at the first frequency F1 which is the default frequency, and the second frequency F2 of the second device 403 may be variably changed to a frequency which does not affect the first frequency F1. Alternatively, the second device 403 may operate at the second frequency F2 which is the default frequency, and the first frequency F1 of the first device 401, of which the state has been changed from the off-state to the on-state, may be variably changed to a frequency different from the second frequency F2. Alternatively, both the first frequency F1 and the second frequency F2 may be changed so as not to affect each other.

According to various embodiments of the present disclosure, in the state where the default frequencies of the first frequency F1 and the second frequency F2 are set to be identical to each other, when the generation of an input by the input tool 701 is sensed, the first frequency F1 may temporarily differ from the second frequency F2. When inputs by the input tool 701 are simultaneously generated in the first device 401 and the second device 403, the first frequency F1 may temporarily differ from the second frequency F2. The first frequency F1 of the first device 401 may be variably changed to a frequency, which does not affect the second frequency F2 of the second device 403, by using the variable frequency scheme. Alternatively, when the generation of an input by the input tool 701 is sensed, the second frequency F2 of the second device 403 may be variably changed to a frequency, which does not affect the first frequency F1 of the first device 401, by using the variable frequency scheme. Alternatively, both the first frequency F1 and the second frequency F2 may be changed so as not to affect each other.

According to various embodiments of the present disclosure, the default frequencies of the first and second frequencies F1 and F2 may be set to be different from each other. The first and second frequencies F1 and F2 may serve as a frequency having a fixed value while the electronic device operates. The first frequency F1 of the first device 401 may be set to a frequency which does not affect the second device 403. Alternatively, the second frequency F2 of the second device 403 may be set to a frequency which does not affect the first device 401. According to various embodiments of the present disclosure, the first frequency F1 and the second frequency F2 may be set to frequencies which do not affect each other.

Meanwhile, when the electronic device 101 further includes an additional device as well as the first device 401 and the second device 403, frequencies used by the respective multiple devices may be set to be different from each other. According to various embodiments of the present disclosure, the respective multiple devices may operate according to frequencies at which the multiple devices do not affect each other.

The processor 509 may process operations of the first device 401 and the second device 403. The processor 509 may correspond to the processor 210 described with reference to FIG. 2. The processor 509 may process inputs of the first and second devices 401 and 403.

Figure 9:
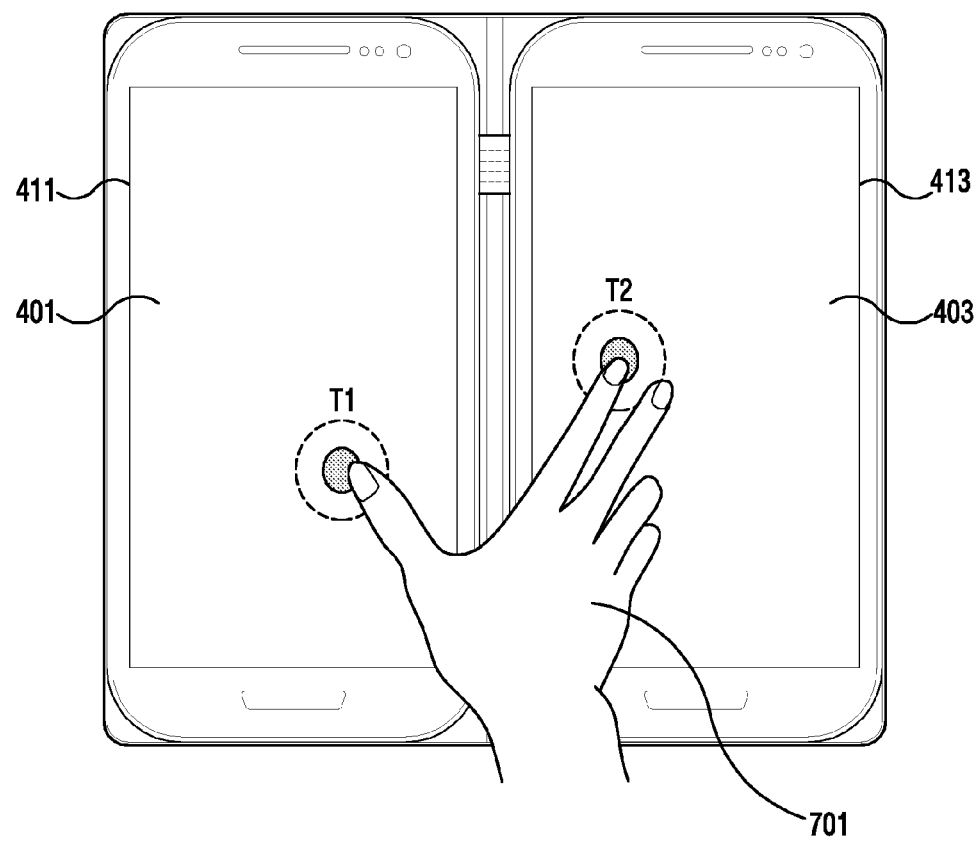

As illustrated in FIG. 9, a malfunction (e.g., a ghost touch) can be avoided when the input tool 701 simultaneously approaches or contacts the first and second devices 401 and 403. For example, the ghost touch can be prevented even when a first touch T1 from the input tool 701 is input to the first device 401 and a second touch T2 from the input tool 701 is input to the second device 403. When the first and second devices 401 and 403 operate at an identical frequency, a signal having a driving frequency characteristic may be moved and delivered to the second device 403 through the input tool 701, and accordingly, frequency interference may occur. Alternatively, when the first and second devices 401 and 403 operate at the identical frequency, electrical charges of the first device 401 may move to the second device 403 by way of the input tool 701, and accordingly, frequency interference may occur. In various embodiments of the present disclosure, this phenomenon can be prevented. For example, even when electrical charges move from the first device 401 to the second device 403 in a state of having a frequency of the first device 401, the frequency of the first device 401 differs from that of the second device 403, and accordingly, a malfunction caused by frequency interference can be prevented. According to various embodiments of the present disclosure, the first and second devices 401 and 403 may at least temporarily operate at different frequencies while the first and second devices 401 and 403 operate, and accordingly, a case can be prevented in which one device becomes a noise source of the other device. Alternatively, the first frequency and the second frequency may be set to be different from each other, and accordingly, a time point of applying a signal to the first device 401 may be different from that of applying a signal to the second device 403. The time point of applying a signal to the first device 401 may be different from that of applying a signal to the second device 403, and accordingly, an error can be prevented when the processor 509 processes a signal. For example, a time point of applying a driving signal to the first transmission electrode 511 and that of applying a driving signal to the second transmission electrode 521 may become different for each line.

FIGS. 10, 11, 12, 13 and 14 are diagrams each illustrating an appearance of an example electronic device according to various example embodiments of the present disclosure.

Figure 10:
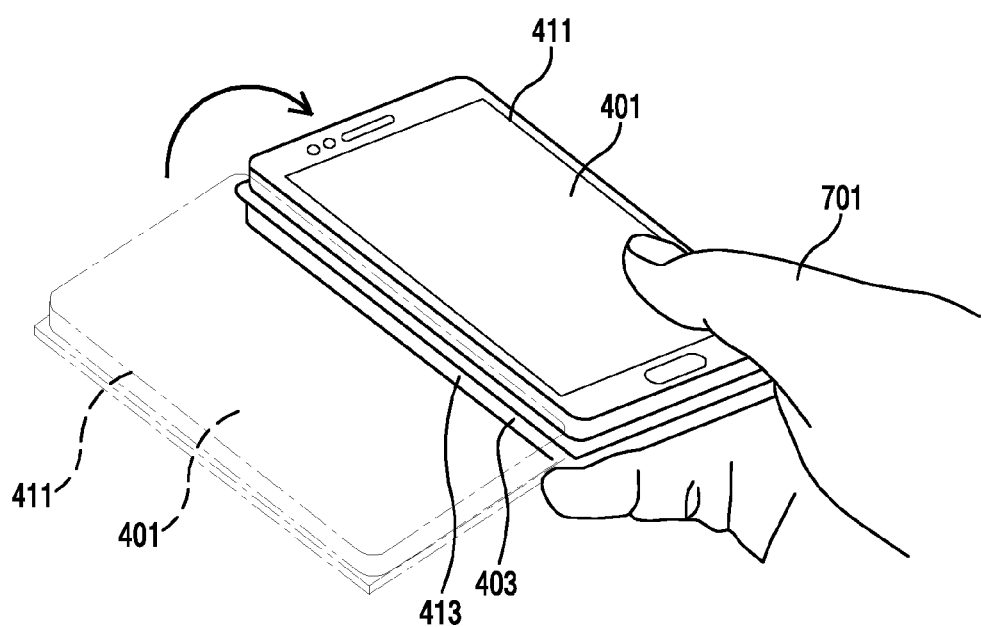
FIGS. 10, 11, 12, 13 and 14 are diagrams illustrating an example appearance of an electronic device according to various example embodiments of the present disclosure.

As illustrated in FIG. 10, according to various embodiments of the present disclosure, the electronic device 101 may be a foldable electronic device. Accordingly, the first area 411 may be folded above the second area 413. Alternatively, the second area 413 may be folded above the first area 411. The first area 411 and the second area 413 may be vertically disposed in a reciprocal manner. Accordingly, the respective devices may be exposed to the outside in a state where the electronic device 101 is folded. For example, each of the first device 401 and the second device 403 may be exposed to the outside. The first device 401 and the second device 403 may mutually overlap. According to various embodiments of the present disclosure, the possibility of a malfunction can be avoided even when each of the first device 401 and the second device 403 contacts the input tool 701 in a state of each of the first device 401 and the second device 403 is exposed to the outside. For example, a malfunction can be prevented even when the input tool 701 is the hand of the user and the user is holding the first device 401 and the second device 403 in the hand of the user in the state where the first device 401 and the second device 403 are folded to be exposed to the outside.

According to various embodiments of the present disclosure, the first device 401 and the second device 403 may be separated from each other. The first device 401 and the second device 403 may be used in a state of being separated from each other, and then, may be connected with each other and may be simultaneously used.

Figure 11:
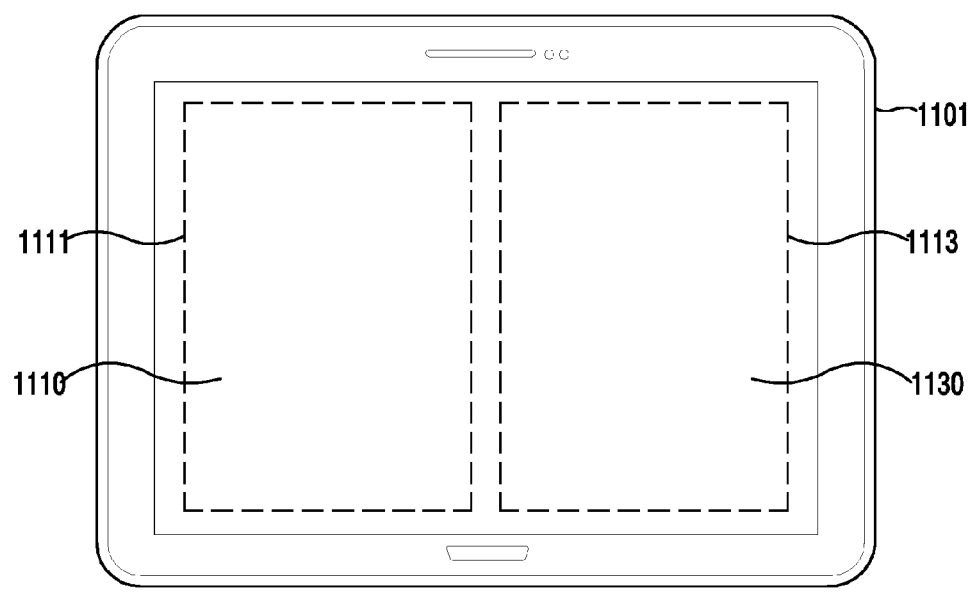
Figure 12:
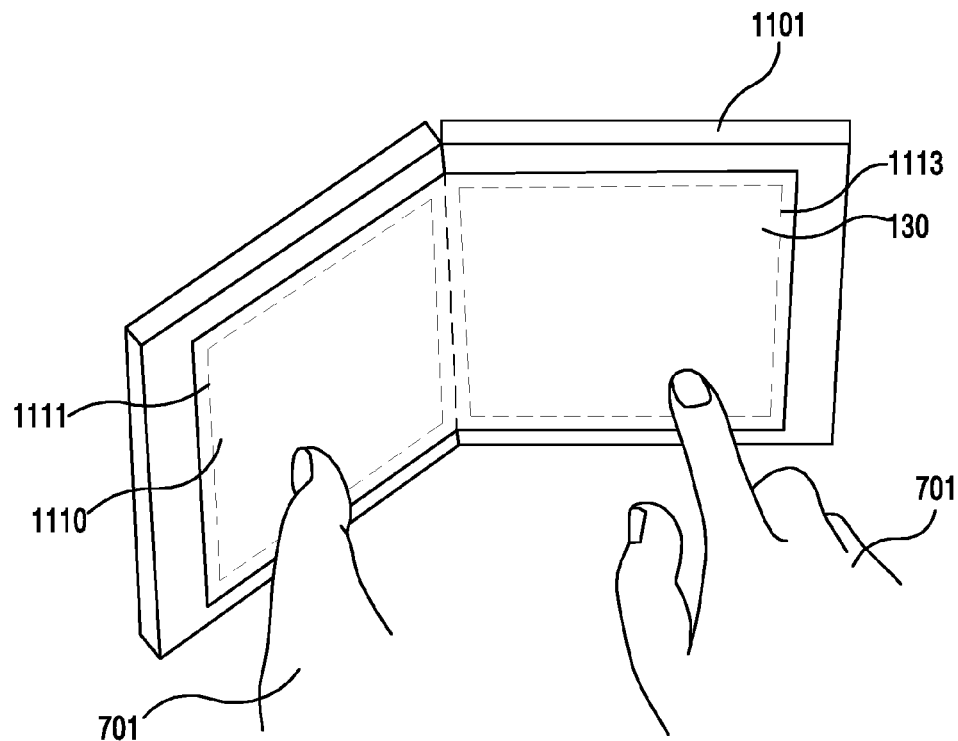

As illustrated in FIGS. 11 and 12, according to various embodiments of the present disclosure, a first device 1110 and a second device 1130 may be formed as one body. Accordingly, the first device 1110 and the second device 1130 may not be distinguished from each other in terms of appearance. The first device 1110 and the second device 1130 may be distinguished from each other in a state of being folded. The first device 1110 and the second device 1130 may be folded by breaking a housing 1101. Accordingly, the first device 1110 in a first area 1111 may be distinguished from the second device 1130 in a second area 1113. In various embodiments of the present disclosure, when the input tool 701 contacts the first device 1110 and the second device 1130, the possibility of a malfunction can be avoided. For example, a malfunction can be prevented even when the input tool 701 is both hands of the user and the user is holding the respective first and second devices 1110 and 1130 in both hands.

Figure 13:
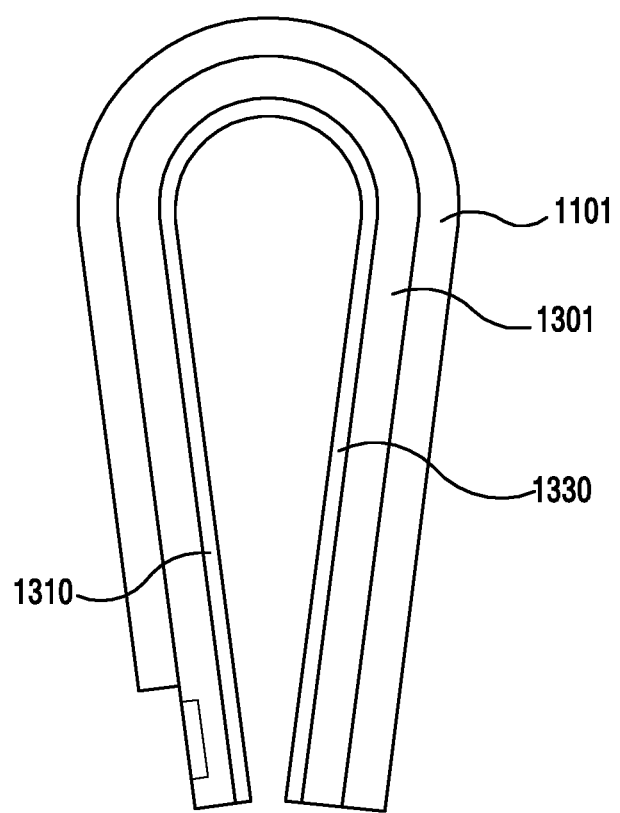
Figure 14:
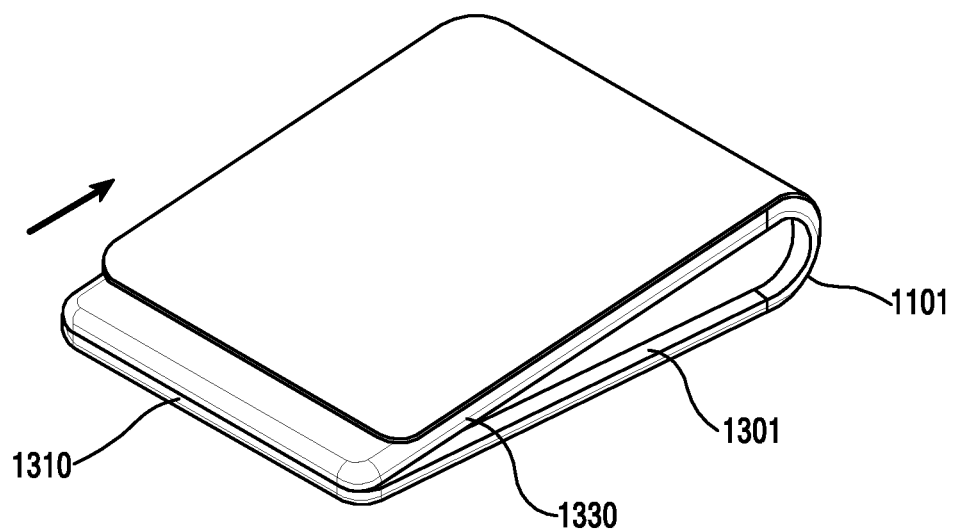

As illustrated in FIGS. 13 and 14, according to various embodiments of the present disclosure, the first device 1310 and the second device 1330 may be formed as one body, and may be configured to be foldable. The first device 1310 and the second device 1330 may be configured to be flexibly bent. The first device 1310 and the second device 1330 may be flexibly folded or wrapped as in the case of paper.

The electronic device 101 may further include a display 1301, and the display 1301 may correspond to the display 260 described with reference to FIG. 2. The display 1301 is an element within the electronic device 101, and may perform an actual operation in the electronic device 101. The display 1301 may perform a function of displaying an image.

Figure 15:
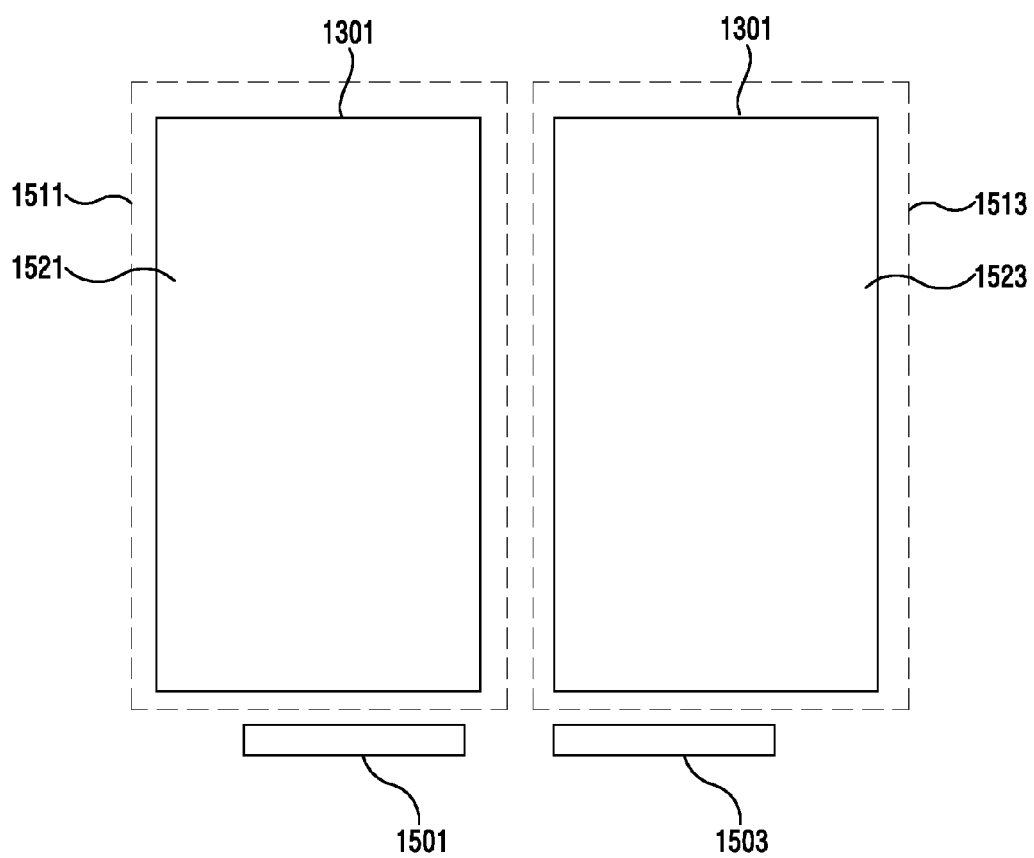
FIGS. 15, 16 and 17 are diagrams illustrating an example appearance of an electronic device according to various example embodiments of the present disclosure.
Figure 16:
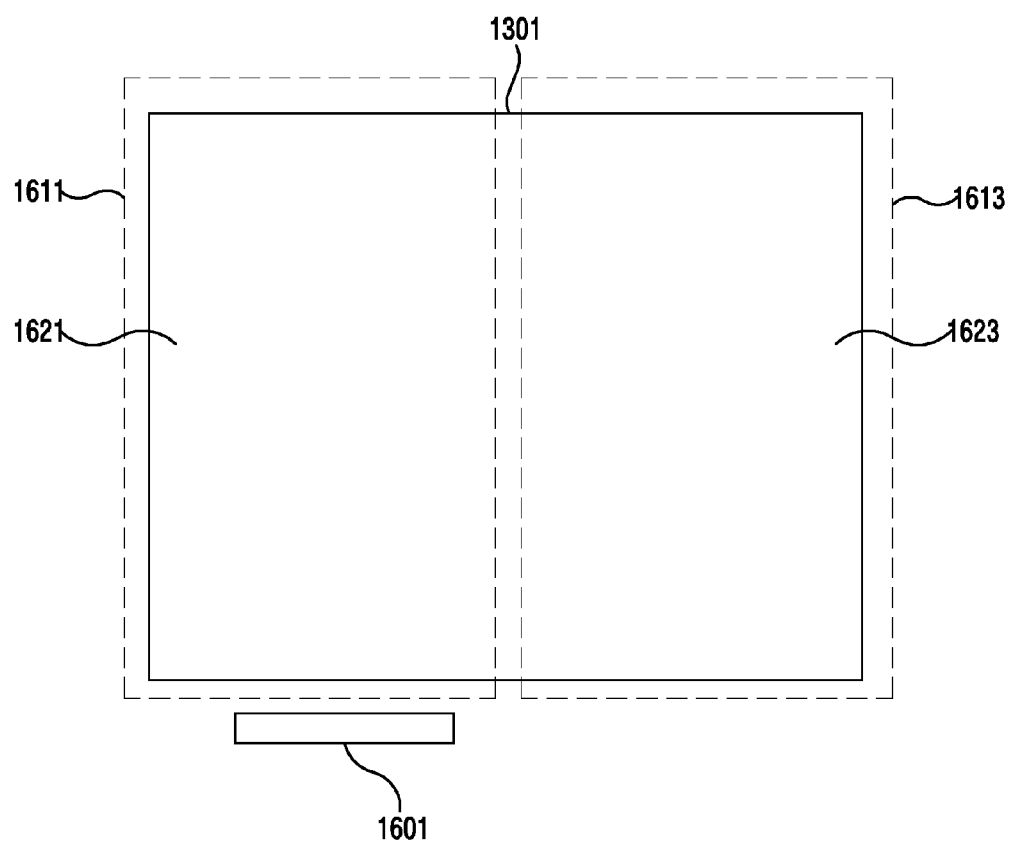
Figure 17:
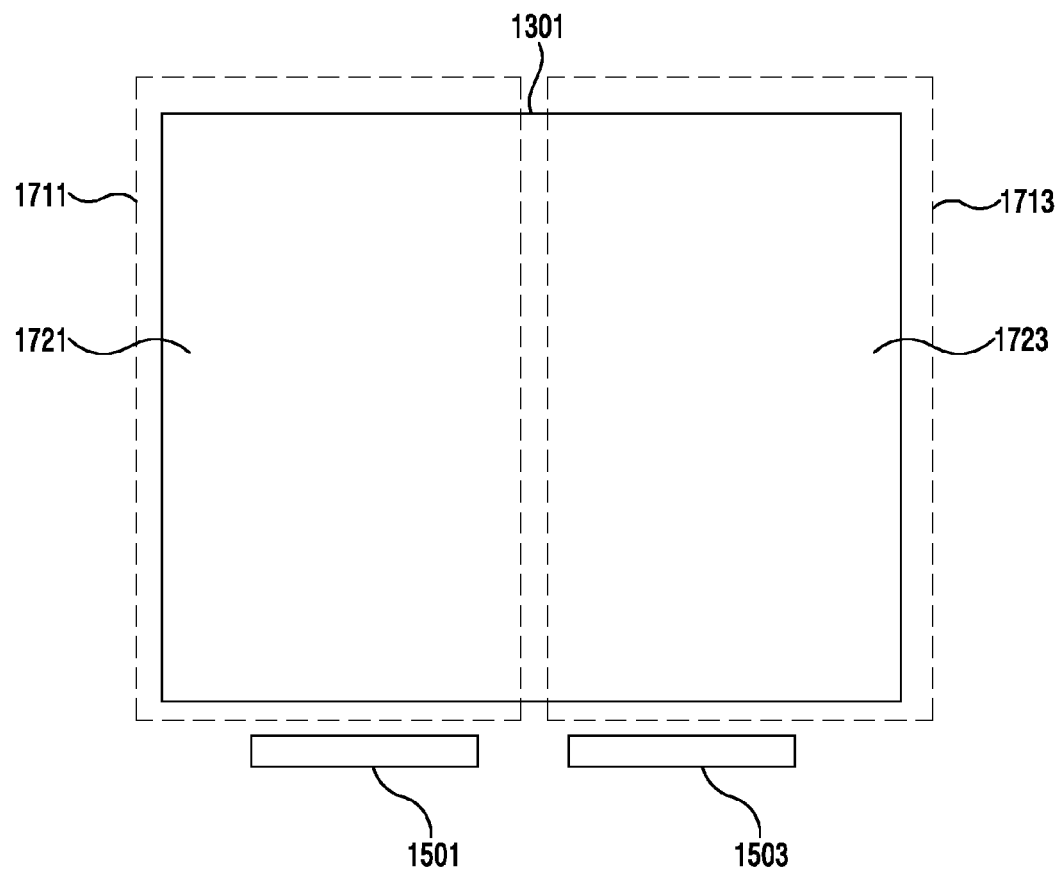

FIGS. 15, 16 and 17 are diagrams each illustrating an appearance of an electronic device according to various example embodiments of the present disclosure.

As illustrated in FIG. 15, each of a first device 1521 disposed in a first area 1511 and a second device 1523 disposed in a second area 1513 may include the display 1301. Driving chips 1501 and 1503 that drive the respective displays 1301's may be included. According to various embodiments of the present disclosure, the first device 1521 and the second device 1523 may include the separate driving chips 1501 and 1503, respectively.

As illustrated in FIG. 16, according to various embodiments of the present disclosure, a first device 1621 disposed in a first area 1611 and a second device 1623 disposed in a second area 1613 may be formed as one body, and may include one display 1301. One driving chip 1601 that drives the display 1301 may be included. According to various embodiments of the present disclosure, the first device 1621 and the second device 1623 may include the one driving chip 1601.

As illustrated in FIG. 17, according to various embodiments of the present disclosure, a first device 1721 disposed in a first area 1711 and a second device 1723 disposed in a second area 1713 may be formed as one body, and may include the respective displays 1301's. Driving chips 1501 and 1503 that drive the respective displays 1301's may be included. According to various embodiments of the present disclosure, the first device 1721 and the second device 1723 may include the separate driving chips 1501 and 1503, respectively.

An electronic device according to various embodiments of the present disclosure includes a housing 1101 including a first area 411 and a second area 413; a first device 401 disposed in the first area 411; and a second device 403 disposed in the second area 413, wherein the first device 401 includes a first touch sensing circuit 520 configured to use a first frequency F1 in order to sense a touch, the second device 403 includes a second touch sensing circuit 530 configured to use a second frequency F2 in order to sense a touch, and the first frequency F1 at least temporarily differs from the second frequency F2 while the first frequency F1 and the second frequency F2 operate.

In the electronic device according to various embodiments of the present disclosure, at least one of the first frequency F1 and the second frequency F2 corresponds to a fixed frequency.

In the electronic device according to various embodiments of the present disclosure, the first frequency F1 and the second frequency F2 are at least partially variable while the first frequency F1 and the second frequency F2 operate.

In the electronic device according to various embodiments of the present disclosure, at least one of the first frequency F1 and the second frequency F2 is variable when the first device 401 is sensed to be in an on-state.

In the electronic device according to various embodiments of the present disclosure, at least one of the first frequency F1 and the second frequency F2 is variable when it is sensed that inputs are generated in the first device 401 and the second device 403.

In the electronic device according to various embodiments of the present disclosure, the first touch sensing circuit 520 includes a first sensing electrode 501, the second touch sensing circuit 530 includes a second sensing electrode 503, the first frequency F1 corresponds to a frequency of a signal for driving the first sensing electrode 501, and the second frequency F2 corresponds to a frequency of a signal for driving the second sensing electrode 503.

In the electronic device according to various embodiments of the present disclosure, the first area 411 and the second area 413 are capable of facing each other.

The electronic device according to various embodiments of the present disclosure is foldable.

Figure 18:
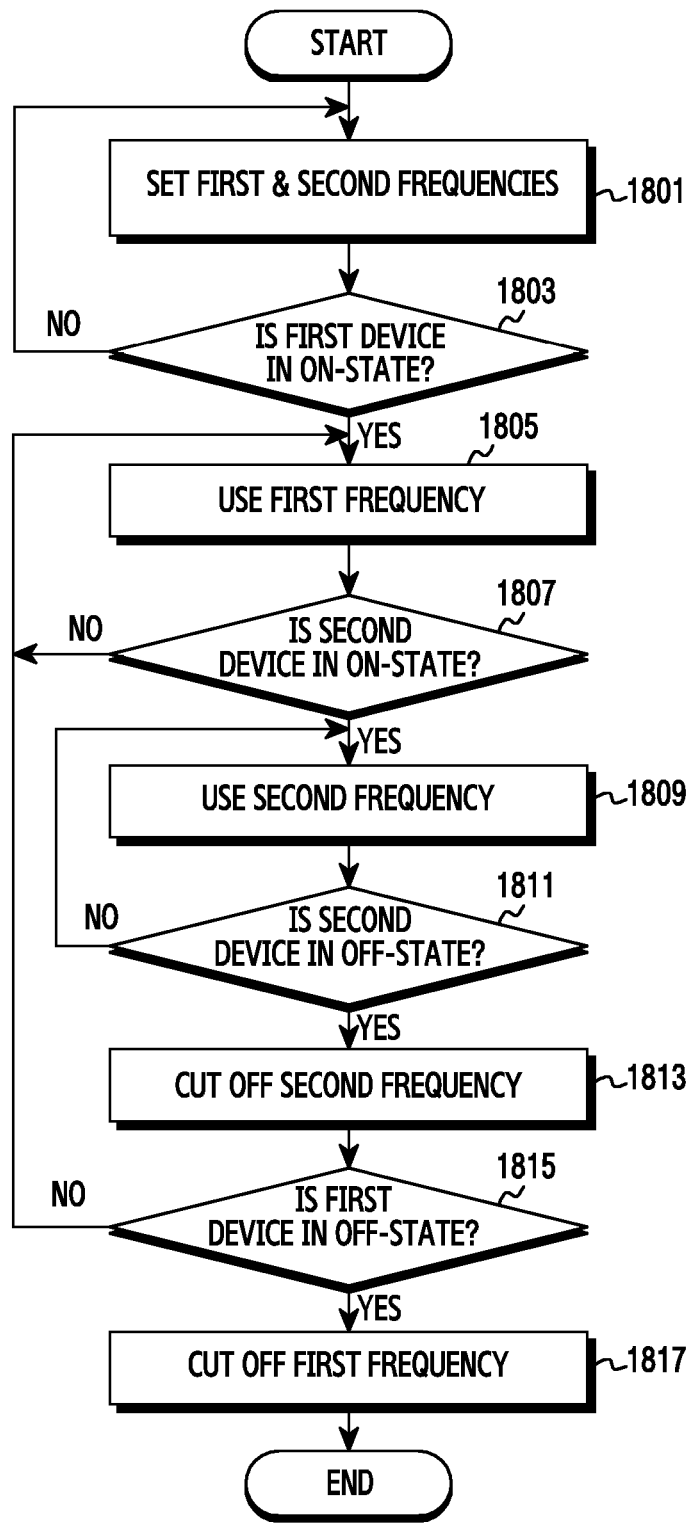
FIGS. 18, 19 and 20 are flowcharts each illustrating an example method of operating an electronic device according to various example embodiments of the present disclosure.

FIG. 18 is a flowchart illustrating an example method of operating an electronic device according to various example embodiments of the present disclosure. Referring to FIG. 18, the method of operating the electronic device according to an embodiment of the present disclosure will be described.

Referring to FIG. 18, the operating method of the electronic device according to an embodiment of the present disclosure will be described.

As illustrated in FIG. 18, in operation 1801, the processor 509 may set the first device 401 and the second device 403 to respectively use different first and second frequencies F1 and F2. The processor 509 may cause the first frequency F1, that the first device 401 uses to sense a touch, and the second frequency F2, that the second device 403 uses to sense a touch, to be different from each other. As the first frequency F1, a frequency may be used which does not affect the second device 403. As the second frequency F2, a frequency may be used which does not affect the first device 401.

In operation 1803, the processor 509 may sense whether the first device 401 is in an on-state. When the processor 509 senses the on-state of the first device 401, in operation 1805, the processor 509 may cause the first device 401 to use the first frequency F1 to sense a touch. In operation 1807, the processor 509 may sense whether the second device 403 is in an on-state. When the processor 509 senses the on-state of the second device 403, in operation 1809, the processor 509 may cause the second device 403 to use the second frequency F2 to sense a touch. In operation 1811, the processor 509 may sense whether the second device 403 is in an off-state. When the processor 509 senses the off-state of the second device 403, in operation 1813, the processor 509 may cut off the second frequency F2. In operation 1815, the processor 509 may sense whether the first device 401 is in an off-state. When the processor 509 senses the off-state of the first device 401, in operation 1817, the processor 509 may cut off the first frequency F1.

Figure 19:
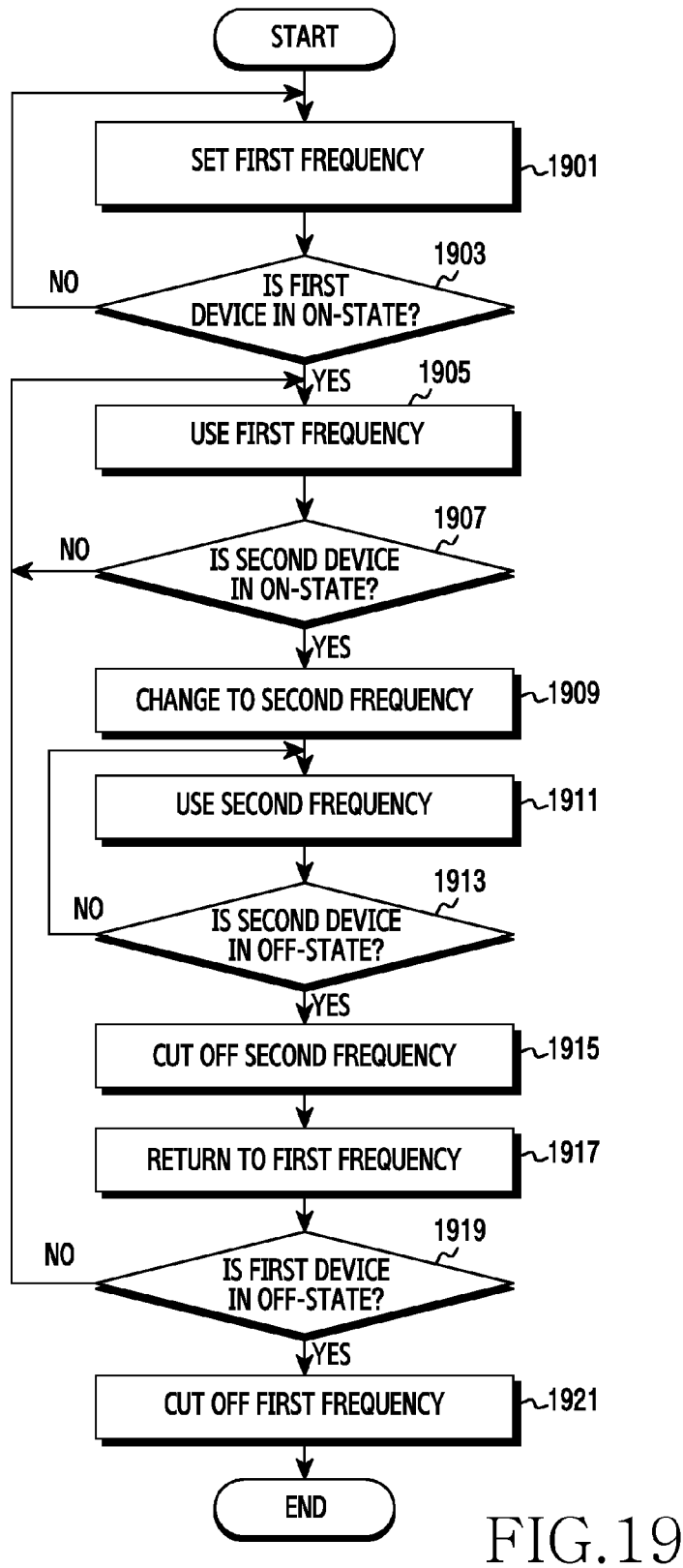

FIG. 19 is a flowchart illustrating an example method of operating an electronic device according to various example embodiments of the present disclosure.

As illustrated in FIG. 19, in operation 1901, the processor 509 may set the first device 401 and the second device 403 to use the first frequency F1. The processor 509 may set the first device 401 and the second device 403 to use the first frequency F1 in order to sense a touch.

In operation 1903, the processor 509 may sense whether the first device 401 is in an on-state. When the processor 509 senses the on-state of the first device 401, in operation 1905, the processor 509 may cause the first device 401 to use the first frequency F1 to sense a touch. In operation 1907, the processor 509 may sense whether the second device 403 is in an on-state. When the processor 509 senses the on-state of the second device 403, in operation 1909, the processor 509 may cause the first device 401 to change a frequency, which is used to sense a touch, to the second frequency F2. For example, the processor 509 may change the first frequency F1, that the first device 401 has used, to the second frequency F2, which is a frequency in a range which does not affect the second device 403, by using the variable frequency scheme. In operation 1911, the processor 509 may cause the first device 401 to use the second frequency F2 and may cause the second device 403 to use the preset first frequency F1. According to various embodiments of the present disclosure, when the processor 509 senses an on-state request of the second device 403, in operation 1913, the processor 509 may change the frequency of the second device 403 to the second frequency F2 and may turn on the second device 403. According to various embodiments of the present disclosure, the processor 509 may change the frequency so that the first device 401 may use the first frequency F1 and the second device 403 may use the second frequency F2. When the processor 509 senses the off-state of the second device 403, in operation 1913, the processor 509 may cut off the second frequency F2 in operation 1915. In operation 1917, the processor 509 may cause the second frequency F2 of the first device 401 to return to the first frequency F1 which is the original setting value. In operation 1919, the processor 509 may sense whether the first device 401 is in an off-state. When the processor 509 senses the off-state of the first device 401, in operation 1921, the processor 509 may cut off the first frequency F1.

Figure 20:
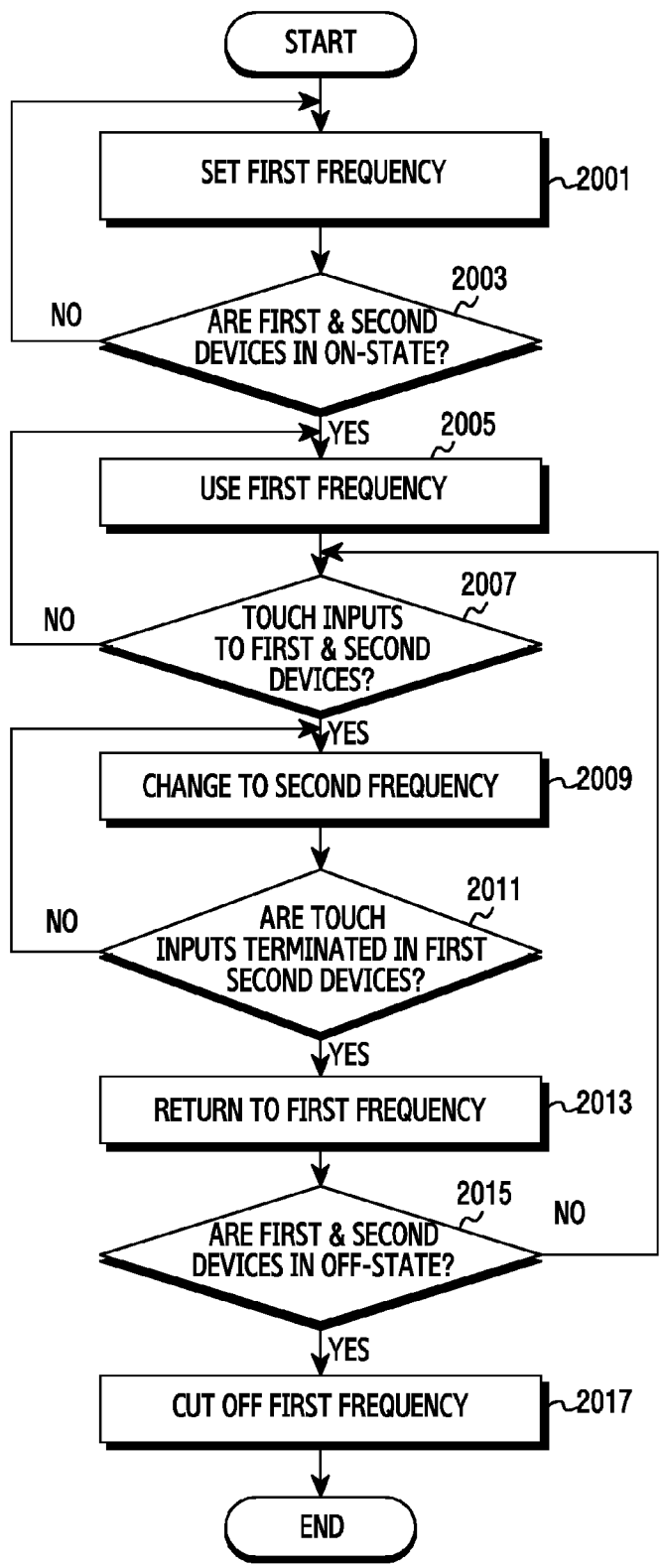

FIG. 20 is a flowchart illustrating an example method of operating an electronic device according to various example embodiments of the present disclosure.

As illustrated in FIG. 20, in operation 2001, the processor 509 may set the first device 401 and the second device 403 to use the first frequency F1. The processor 509 may set the first device 401 and the second device 403 to use the first frequency F1 to sense a touch.

In operation 2003, the processor 509 may sense whether the first device 401 and the second device 403 are both in an on-state. When the processor 509 senses the on-states of the first device 401 and the second device 403, in operation 2005, the processor 509 may cause the first device 401 and the second device 403 to use the first frequency F1. In operation 2007, the processor 509 may sense whether touch inputs are generated in the first device 401 and the second device 403. For example, in operation 2007, the processor 509 may sense whether touch inputs are simultaneously generated in the first device 401 and the second device 403. When the processor 509 senses that the touch inputs are simultaneously generated in the first device 401 and the second device 403, in operation 2009, the processor 509 may change the frequency, that the first device 401 uses, to the second frequency F2. An embodiment of the present disclosure is not limited to this configuration, and thus, in operation 2009, the processor 509 may change the frequency, that the second device 403 uses, to the second frequency F2. In operation 2011, the processor 509 may sense whether the touch inputs are terminated in the first device 401 and the second device 403. When the processor 509 senses that the touch inputs are terminated in the first device 401 and the second device 403, in operation 2013, the processor 509 may cause the frequency, that the first device 401 uses, to return to the first frequency F1 which is the original setting value. Alternatively, when, in operation 2009, the processor 509 has changed the frequency, that the second device 403 has used, to the second frequency F2, in operation 2013, the processor 509 may cause the frequency, that the second device 403 uses, to return to the first frequency F1 which is the original setting value. In operation 2015, the processor 509 may sense whether the first device 401 and the second device 403 are both in an off-state. When the processor 509 senses the off-states of the first device 401 and the second device 403, in operation 2017, the processor 509 may cut off the first frequency F1.

A method of operating an electronic device according to various embodiments of the present disclosure includes using a first frequency F1 for sensing a touch so as to correspond to a first device 401; and using a second frequency F2 for sensing a touch so as to correspond to a second device 403, wherein the first frequency F1 at least temporarily differs from the second frequency F2 while the first frequency F1 and the second frequency F2 operate.

In the operating method of the electronic device according to various embodiments of the present disclosure, the first frequency F1 differs from the second frequency F2.

In the operating method of the electronic device according to various embodiments of the present disclosure, the first frequency F1 is identical to the second frequency F2.

The operating method of the electronic device according to various embodiments of the present disclosure includes changing at least one of the first frequency F1 and the second frequency F2 when the first device 401 and the second device 403 are both in an on-state.

The operating method of the electronic device according to various embodiments of the present disclosure includes changing at least one of the first frequency F1 and the second frequency F2 when it is sensed that inputs are generated in the first device 401 and the second device 403.

The operating method of the electronic device according to various embodiments of the present disclosure further includes causing the changed frequency to return to an original setting value when at least one of the first device 401 and the second device 403 is in an off-state.

The operating method of the electronic device according to various embodiments of the present disclosure further includes causing the changed frequency to return to an original setting value when the generation of the inputs in the first device 401 and the second device 403 is terminated.

The features, the structures, the effects, and the like, which have been described in the above-described embodiments of the present disclosure, are included in at least one embodiment of the present disclosure, and are not necessarily limited to only one embodiment of the present disclosure. Further, the features, the structures, the effects, and the like exemplified in each embodiment of the present disclosure may be combined or modified and may be practiced in other embodiments of the present disclosure by those having ordinary knowledge in the technical field to which embodiments of the present disclosure pertain. Therefore, configurations related to the combination and modification thereof should be construed as falling within the scope of the present disclosure.

Also, hereinabove, the description has been made on the embodiments of the present disclosure, but the embodiments of the present disclosure are for illustrative purposes only and do not limit the present disclosure. Those having ordinary knowledge in the technical field, to which the present disclosure pertains, will appreciate that various modifications and applications which are not exemplified hereinabove may be made to the embodiments described herein without departing from the scope of the present disclosure. For example, the respective elements specifically described in the embodiments of the present disclosure may be modified and practiced. Further, the differences related to these modifications and applications should be construed as falling within the scope of the present disclosure defined in the appended claims.

Therefore, the electronic device according to various example embodiments of the present disclosure can prevent and/or reduce the occurrence of a malfunction caused by frequency interference since the frequency of the first device differs from that of the second device. According to various example embodiments of the present disclosure, the first device and the second device at least temporarily operate at different frequencies while the first device and the second device operate, and accordingly, a case can be prevented and/or reduced in which one device becomes a noise source of the other device. Alternatively, the frequency of the first device can be set to be different from that of the second device, and accordingly, a time point of applying a signal to the first device can be different from that of applying a signal to the second device. The time point of applying a signal to the first device can be different from that of applying a signal to the second device, and accordingly, an error can be prevented and/or reduced when the processor processes a signal.

What is claimed is:

1. An electronic device comprising:
    a housing including a first surface and a second surface;
    a flexible display comprising a first area disposed in the first surface; and a second area disposed in the second surface; and
    a processor configured to control the flexible display to provide a first frequency to sense a first touch on the first area and a second frequency to sense a second touch on the second area, wherein both the first frequency and the second frequency are initially fixed to an identical frequency and variable to be set to vary at least temporarily to correspond to two distinctive fixed frequencies while the electronic device operates.

2. The electronic device as claimed in claim 1, wherein the first frequency and the second frequency are at least partially variable while the electronic device operates.

3. The electronic device as claimed in claim 1, wherein the processor is further configured to identify an on/off state of the first area and the second area,
    wherein one or both of the first frequency and the second frequency is variable based on determining that one of the first area and the second area turns to the on-state while the other of the first area and the second area is in the on-state.

4. The electronic device as claimed in claim 1, wherein one or both of the first frequency and the second frequency is variable based on identifying that both the first touch and the second touch are inputted in the first area and the second area respectively.

5. The electronic device as claimed in claim 1, wherein the first area includes a first sensing electrode, the second area includes a second sensing electrode, the first frequency corresponds to a frequency of a signal for driving the first sensing electrode, and the second frequency corresponds to a frequency of a signal for driving the second sensing electrode.

6. The electronic device as claimed in claim 1, wherein the first area and the second area are capable of folding outwardly.

7. The electronic device as claimed in claim 6, wherein the processor is further configured to identify an on/off state of the first and the second area,
   wherein the first area and the second area are folded outwardly, and
   wherein one or both of the first frequency and the second frequency is variable based on identifying that both the first touch and the second touch are inputted in the first area and the second area respectively.

8. A method of operating an electronic device including a flexible display having a first area and a second area respectively disposed in a first surface and a second surface of a housing, the method comprising:
   providing a first frequency for sensing a first touch corresponding to the first area; and
   providing a second frequency for sensing a second touch corresponding to the second area,
   wherein both the first frequency and the second frequency are initially fixed to an identical frequency and variable to be set to vary at least temporarily to correspond to two distinctive frequencies while the electronic device operates.

9. The operating method as claimed in claim 8, wherein the first frequency and the second frequency are at least partially variable while the electronic device operates.

10. The operating method as claimed in claim 8, wherein further comprising:
    identifying an on/off state of the first area and the second area; and
    changing one or both of the first frequency and the second frequency based on determining that one of the first area and the second area turns to the on-state while the other of the first area and the second area is in the on-state.

11. The operating method as claimed in claim 10, further comprising causing the changed frequency to return to an original setting value based on identifying that at least one of the first area and the second area turns to off-state.

12. The operating method as claimed in claim 8, further comprising changing one or both of the first frequency and the second frequency based on identifying that both the first touch and the second touch are inputted in the first area and the second area respectively.

13. The operating method as claimed in claim 12, further comprising causing the changed frequency to return to an original setting value based on identifying that at least one of the first touch and the second touch inputted in the first area and the second area is terminated.

* * * * *